United States Patent
Ma et al.

(10) Patent No.: US 12,513,703 B2
(45) Date of Patent: Dec. 30, 2025

(54) COMMUNICATION METHOD AND APPARATUS

(71) Applicant: Huawei Technologies Co., Ltd., Shenzhen (CN)

(72) Inventors: Ruixiang Ma, Shenzhen (CN); Shengyu Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 723 days.

(21) Appl. No.: 17/884,054

(22) Filed: Aug. 9, 2022

(65) Prior Publication Data
US 2022/0386289 A1 Dec. 1, 2022

Related U.S. Application Data

(63) Continuation of application No. PCT/CN2020/074905, filed on Feb. 12, 2020.

(51) Int. Cl.
*H04W 72/04* (2023.01)
*H04W 72/0446* (2023.01)
*H04W 72/23* (2023.01)

(52) U.S. Cl.
CPC ....... *H04W 72/23* (2023.01); *H04W 72/0446* (2013.01)

(58) Field of Classification Search
CPC ............................ H04W 72/23; H04W 72/0446
See application file for complete search history.

(56) References Cited

U.S. PATENT DOCUMENTS

| 11,387,951 | B2 | 7/2022 | Peng et al. |
| 2019/0312713 | A1 | 10/2019 | Yang et al. |
| 2019/0356456 | A1 | 11/2019 | Park |
| 2021/0218537 | A1* | 7/2021 | Chen ............... H04L 5/0044 |
| 2021/0314095 | A1* | 10/2021 | Gao ................. H04L 1/1614 |

(Continued)

FOREIGN PATENT DOCUMENTS

| CN | 110086579 A | 8/2019 |
| CN | 110166180 A | 8/2019 |

(Continued)

OTHER PUBLICATIONS

"3rd Generation Partnership Project; Technical Specification Group Radio Access Network; NR; Multiplexing and channel coding (Release 16)," 3GPP TS 38.212 V16.0.0, Dec. 2019, 145 pages.

(Continued)

*Primary Examiner* — Melvin C Marcelo
(74) *Attorney, Agent, or Firm* — Slater Matsil, LLP

(57) ABSTRACT

This application provides a communication method and apparatus, and relates to the field of communication technologies, to improve data transmission reliability and resource utilization. The method includes: After the terminal device determines a candidate time domain resource set, the terminal device determines, based on the candidate time domain resource set, a codebook to be fed back to a network device. The codebook includes feedback information of one or more physical downlink shared channels PDSCHs, and the one or more PDSCHs are transmitted by using a time domain resource position indicated by the candidate time domain resource set.

19 Claims, 7 Drawing Sheets

(56) References Cited

U.S. PATENT DOCUMENTS

2021/0391956 A1* 12/2021 Gou ................. H04L 1/1614
2022/0029752 A1* 1/2022 Gou ................. H04L 1/1848

FOREIGN PATENT DOCUMENTS

| CN | 110505040 A | 11/2019 | | |
|---|---|---|---|---|
| CN | 110535569 A | 12/2019 | | |
| CN | 110535587 A | 12/2019 | | |
| EP | 3817261 A1 | 5/2021 | | |
| EP | 4096129 A1 * | 11/2022 | ............ | H04W 72/23 |
| WO | 2019219072 A1 | 11/2019 | | |
| WO | WO-2021159320 A1 * | 8/2021 | ............ | H04W 72/23 |

OTHER PUBLICATIONS

"3rd Generation Partnership Project; Technical Specification Group Radio Access Network; NR; Physical layer procedures for control (Release 15)," 3GPP TS 38.213 V15.8.0, Dec. 2019, 109 pages.

"3rd Generation Partnership Project; Technical Specification Group Radio Access Network; NR; Radio Resource Control (RRC) protocol specification (Release 15)," 3GPP TS 38.331 V15.8.0, Dec. 2019, 532 pages.

"Corrections on CA Operation," Document for: Discussion and Decision, Agenda item: 7.1.3.4.2, Source: Samsung, 3GPP TSG RAN WG1 Meeting #92bis, R1-1804381, Sanya, China, Apr. 16-20, 2018, 5 pages.

* cited by examiner

| Symbol 0 | Symbol 1 | Symbol 2 | Symbol 3 | Symbol 4 | Symbol 5 | Symbol 6 | Symbol 7 | Symbol 8 | Symbol 9 | Symbol 10 | Symbol 11 | Symbol 12 | Symbol 13 |
|---|---|---|---|---|---|---|---|---|---|---|---|---|---|
|  | ▨ | ▨ |  |  |  |  |  |  |  |  |  |  |  |
|  |  | ▨ | ▨ | ▨ | ▨ |  |  |  |  |  |  |  |  |
|  |  |  |  |  | ▨ | ▨ | ▨ | ▨ | ▨ |  |  |  |  |
|  |  |  |  |  |  |  |  |  |  |  | ▨ | ▨ | ▨ |

FIG. 3

COMMUNICATION METHOD AND APPARATUS

CROSS-REFERENCE TO RELATED APPLICATIONS

This application is a continuation of International Application No. PCT/CN2020/074905, filed on Feb. 12, 2020, the disclosure of which is hereby incorporated by reference in its entirety.

TECHNICAL FIELD

This application relates to the field of communication technologies, and in particular, to a communication method and apparatus.

BACKGROUND

In a semi-static codebook mode, a terminal device determines, based on preset information, a receiving occasion of a candidate physical downlink shared channel (PDSCH). On the receiving occasion of the candidate PDSCH, the terminal device receives downlink data carried on the PDSCH, and then feeds back a hybrid automatic repeat request (HARQ) response message to a network device. Each HARQ response message corresponds to values of a group of bits, to represent a PDSCH receiving status of the terminal device on a receiving occasion of a corresponding candidate PDSCH. In a time unit, consecutive bits including HARQ response messages corresponding to receiving occasions of different candidate PDSCHs are referred to as a codebook.

However, a new downlink control information (DCI) format used for downlink data scheduling, namely, a DCI format 1_2, is introduced in new radio (NR). When a time domain resource list indicated by the DCI format 1_2 is a newly introduced time domain resource list (for example, a time domain resource allocation list-for DCI format 1_2 (PDSCH-time domain allocation list-for DCI format 1_2)), if an existing process of determining a semi-static codebook is still used, when determining a receiving occasion of a candidate PDSCH, the terminal device does not reference time domain resource information in the newly introduced time domain resource list, and cannot determine a bit position corresponding to a receiving occasion of a corresponding candidate PDSCH in the semi-static codebook. Consequently, a corresponding HARQ response message cannot be fed back, and data transmission reliability is affected.

SUMMARY

Embodiments of this application provide a communication method and apparatus, to improve data transmission reliability and resource utilization.

To achieve the foregoing objective, the following technical solutions are used in embodiments of this application.

According to a first aspect, embodiments of this application provide a communication method. The method may be performed by a terminal device, or may be performed by a chip used in the terminal device. The following provides descriptions by using an example in which an execution body is the terminal device. The method includes: After the terminal device determines a candidate time domain resource set, the terminal device determines, based on the candidate time domain resource set, a codebook to be fed back to a network device. The codebook includes feedback information of one or more PDSCHs, and the one or more PDSCHs are transmitted by using a time domain resource position indicated by the candidate time domain resource set. The candidate time domain resource set includes at least one of the following three time domain resource sets: a first time domain resource set, a second time domain resource set, or a third time domain resource set. When the candidate time domain resource set includes one time domain resource set, the candidate time domain resource set is a corresponding time domain resource set. When the candidate time domain resource set includes a plurality of time domain resource sets, the candidate time domain resource set is a union set of the plurality of time domain resource sets.

Herein, a time domain resource allocation list (time domain allocation list) that is configured by using PDSCH-common configuration signaling (PDSCH-configcommon) or a time domain resource allocation list that is predefined in a protocol is denoted as a time domain resource list 0. All time domain resources indicated by the time domain resource list 0 are described as the first time domain resource set. A time domain resource allocation list (PDSCH-time domain allocation list) that is configured by using PDSCH configuration signaling (PDSCH-config) and that is used for a DCI format 1_0 and/or a DCI format 1_1 is denoted as a time domain resource list 1. All time domain resources indicated by the time domain resource list 1 are described as the second time domain resource set. A time domain resource allocation list-for DCI format 1_2 (PDSCH-time domain allocation list-for DCI format 1_2) that is configured by using the PDSCH configuration signaling (PDSCH-config) is denoted as a time domain resource list 2. All time domain resources indicated by the time domain resource list 2 are described as the third time domain resource set.

In this way, the candidate time domain resource set can include all possible time domain resource sets. The codebook is determined based on the candidate time domain resource set, and the codebook includes feedback information corresponding to all possible time domain resource positions, to improve data transmission reliability. When the codebook includes the feedback information corresponding to all the possible time domain resource positions, data can be transmitted at all the possible time domain resource positions, to improve data scheduling flexibility and resource utilization.

In a possible design, before the terminal device determines the candidate time domain resource set, the communication method in embodiments of this application further includes: The terminal device receives indication information from the network device. That the terminal device determines the candidate time domain resource set includes: The terminal device determines the candidate time domain resource set based on the indication information.

In a possible design, that the terminal device determines the candidate time domain resource set based on the indication information includes: If first indication information does not include configuration information of the second time domain resource set, but includes configuration information of the third time domain resource set, the terminal device determines that the candidate time domain resource set is a union set of the first time domain resource set and the third time domain resource set. Alternatively, if the first indication information includes the configuration information of the second time domain resource set and the configuration information of the third time domain resource set, the terminal device determines that the candidate time domain resource set is a union set of the first time domain resource set, the second time domain resource set, and the third time domain resource set. Alternatively, if the first indication information includes the configuration information of the second time domain resource set, but does not include the configuration information of the third time domain resource set, the terminal device determines that the candidate time domain resource set is a union set of the first time domain resource set and the second time domain resource set. Alternatively, if the first indication information includes neither the configuration information of the second time domain resource set nor the configuration information of the third time domain resource set, the terminal device determines that the candidate time domain resource set is the first time domain resource set.

That is, when the terminal device determines the candidate time domain resource set with reference to a configuration status of the third time domain resource set, even if the candidate time domain resource set does not include the third time domain resource set, there is no omission of a possible time domain resource position, to ensure that the codebook can include the feedback information of the PDSCH at all possible time domain resource positions, and to ensure transmission reliability and improve resource utilization.

In a possible design, the indication information is one or more pieces of DCI. That the terminal device determines the candidate time domain resource set based on the indication information includes: The terminal device determines the candidate time domain resource set based on a DCI format of the DCI or DCI formats of the plurality of pieces of DCI.

In this way, when the indication information is the one or more pieces of DCI, the terminal device can also determine the corresponding candidate time domain resource set based on the DCI format, so that the candidate time domain resource set includes time domain resource positions corresponding to all possible DCI formats, to avoid omission of a possible time domain resource position.

In a possible design, the indication information is used to indicate a DCI format of one piece of DCI or DCI formats of a plurality of pieces of DCI. That the terminal device determines the candidate time domain resource set based on the indication information includes: The terminal device determines the candidate time domain resource set based on the DCI format of the DCI or the DCI formats of the plurality of pieces of DCI.

In this way, when the indication information indicates the DCI format of the DCI or the DCI formats of the plurality of pieces of DCI, the terminal device can also determine the corresponding candidate time domain resource set based on the DCI format, so that the candidate time domain resource set includes time domain resource positions corresponding to all possible DCI formats, to avoid omission of a possible time domain resource position.

In a possible design, that the terminal device determines the candidate time domain resource set based on the DCI format of the DCI or the DCI formats of the plurality of pieces of DCI includes: If the DCI format of the DCI or the DCI formats of the plurality of pieces of DCI is/are a first DCI format/first DCI formats, the terminal device determines that the candidate time domain resource set is a time domain resource set corresponding to the first DCI format/first DCI formats. Alternatively, if the DCI formats of the plurality of pieces of DCI are second DCI formats, and there are a plurality of second DCI formats, the terminal device determines that the candidate time domain resource set is a union set of a plurality of time domain resource sets corresponding to the second DCI formats.

In this way, regardless of whether there are one or more DCI formats, the terminal device can determine, based on a corresponding DCI format, a candidate time domain resource set, and there is no omission of a time domain resource position corresponding to a DCI format. In addition, the candidate time domain resource set can include a time domain resource set corresponding to a corresponding DCI format, but does not include all time domain resource sets. Therefore, a quantity of bits in the codebook is correspondingly reduced, and transmission resource overheads are reduced, to further ensure transmission reliability.

In a possible design, the first time domain resource set is a preset time domain resource set. That the terminal device determines the candidate time domain resource set based on the DCI format of the DCI or the DCI formats of the plurality of pieces of DCI includes: If the DCI format of the DCI or the DCI formats of the plurality of pieces of DCI includes/include a third DCI format, but does/do not include a fourth DCI format, the terminal device determines that the candidate time domain resource set is a union set of a time domain resource set corresponding to the third DCI format and the first time domain resource set. Alternatively, if the DCI format of the DCI or the DCI formats of the plurality of pieces of DCI does/do not include the third DCI format, but includes/include the fourth DCI format, the terminal device determines that the candidate time domain resource set is a union set of a time domain resource set corresponding to the fourth DCI format and the first time domain resource set. Alternatively, if the DCI formats of the plurality of pieces of DCI include the third DCI format and the fourth DCI format, the terminal device determines that the candidate time domain resource set is a union set of the time domain resource set corresponding to the third DCI format, the time domain resource set corresponding to the fourth DCI format, and the first time domain resource set. Alternatively, if the DCI format of the DCI or the DCI formats of the plurality of pieces of DCI includes/include neither the third DCI format nor the fourth DCI format, the terminal device determines that the candidate time domain resource set is the first time domain resource set.

The third DCI format is the DCI format 1_2, and the fourth DCI format is the DCI format 1_1.

In this way, regardless of whether the DCI format includes the third DCI format, the terminal device can determine a corresponding candidate time domain resource set. Because the third DCI format is referenced in a process of determining the candidate time domain resource set, there is no omission of a time domain resource position corresponding to the third DCI format, to ensure that the codebook can include the feedback information of the PDSCH at all possible time domain resource positions, and to ensure transmission reliability.

According to a second aspect, embodiments of this application provide a communication method. The method may be performed by a network device, or may be performed by a chip used in the network device. The following provides descriptions by using an example in which an execution body is the network device. The method includes: After the network device determines a candidate time domain resource set, the network device determines a quantity of bits in a to-be-received codebook from a terminal device based on the candidate time domain resource set. The codebook includes feedback information of one or more physical downlink shared channels PDSCHs, and the one or more PDSCHs are transmitted by using a time domain resource position indicated by the candidate time domain resource set.

In a possible design, before the network device determines the candidate time domain resource set, the communication method in embodiments of this application further includes: The network device sends indication information to the terminal device. That the network device determines the candidate time domain resource set includes: The network device determines the candidate time domain resource set based on the indication information.

In a possible design, a first time domain resource set is a preset time domain resource set. That the network device determines the candidate time domain resource set based on the indication information includes: If the indication information does not include configuration information of a second time domain resource set, but includes configuration information of a third time domain resource set, the network device determines that the candidate time domain resource set is a union set of the first time domain resource set and the second time domain resource set. Alternatively, if the indication information includes the configuration information of the second time domain resource set and the configuration information of the third time domain resource set, the network device determines that the candidate time domain resource set is a union set of the first time domain resource set, the second time domain resource set, and the third time domain resource set. Alternatively, if the first indication information includes the configuration information of the second time domain resource set, but does not include the configuration information of the third time domain resource set, the terminal device determines that the candidate time domain resource set is a union set of the first time domain resource set and the second time domain resource set. Alternatively, if the first indication information includes neither the configuration information of the second time domain resource set nor the configuration information of the third time domain resource set, the terminal device determines that the candidate time domain resource set is the first time domain resource set.

In a possible design, the indication information is one or more pieces of DCI. That the network device determines the candidate time domain resource set based on the indication information includes: The network device determines the candidate time domain resource set based on a DCI format of the DCI or DCI formats of the plurality of pieces of DCI.

In a possible design, the indication information is used to indicate a DCI format of one piece of DCI or DCI formats of a plurality of pieces of DCI. That the network device determines the candidate time domain resource set based on the indication information includes: The network device determines the candidate time domain resource set based on the DCI format of the DCI or the DCI formats of the plurality of pieces of DCI.

In a possible design, that the network device determines the candidate time domain resource set based on the DCI format of the DCI or the DCI formats of the plurality of pieces of DCI includes: If the DCI format of the DCI or the DCI formats of the plurality of pieces of DCI is/are a first DCI format/first DCI formats, the network device determines that the candidate time domain resource set is a time domain resource set corresponding to the first DCI format/first DCI formats. Alternatively, if the DCI formats of the plurality of pieces of DCI are second DCI formats, and there are a plurality of second DCI formats, the network device determines that the candidate time domain resource set is a union set of a plurality of time domain resource sets corresponding to the second DCI formats.

In a possible design, the first time domain resource set is a preset time domain resource set. That the network device determines the candidate time domain resource set based on the DCI format of the DCI or the DCI formats of the plurality of pieces of DCI includes: If the DCI format of the DCI or the DCI formats of the plurality of pieces of DCI includes/include a third DCI format, but does/do not include a fourth DCI format, the network device determines that the candidate time domain resource set is a union set of a time domain resource set corresponding to the third DCI format and the first time domain resource set. Alternatively, if the DCI format of the DCI or the DCI formats of the plurality of pieces of DCI does/do not include the third DCI format, but includes/include the fourth DCI format, the network device determines that the candidate time domain resource set is a union set of a time domain resource set corresponding to the fourth DCI format and the first time domain resource set. Alternatively, if the DCI formats of the plurality of pieces of DCI include the third DCI format and the fourth DCI format, the network device determines that the candidate time domain resource set is a union set of the time domain resource set corresponding to the third DCI format, the time domain resource set corresponding to the fourth DCI format, and the first time domain resource set. Alternatively, if the DCI format of the DCI or the DCI formats of the plurality of pieces of DCI includes/include neither the third DCI format nor the fourth DCI format, the network device determines that the candidate time domain resource set is the first time domain resource set.

According to a third aspect, embodiments of this application provide a communication apparatus. The communication apparatus includes a unit configured to perform the steps according to any one of the foregoing aspects. The communication apparatus may be the terminal device in the first aspect, or an apparatus including the terminal device. Alternatively, the communication apparatus may be the network device in the second aspect, or an apparatus including the network device.

According to a fourth aspect, embodiments of this application provide a communication apparatus, including a processor and an interface circuit. The processor is configured to: communicate with another apparatus by using the interface circuit, and perform the communication method provided in any one of the foregoing aspects. There are one or more processors. The communication apparatus may be the terminal device in the first aspect, or an apparatus including the terminal device. Alternatively, the communication apparatus may be the network device in the second aspect, or an apparatus including the network device.

According to a fifth aspect, embodiments of this application provide a communication apparatus, including a processor. The processor is configured to be connected to a memory, and invoke a program stored in the memory, to perform the communication method provided in any one of the foregoing aspects. The memory may be located inside the communication apparatus, or may be located outside the communication apparatus. There are one or more processors. The communication apparatus may be the terminal device in the first aspect, or an apparatus including the terminal device. Alternatively, the communication apparatus may be the network device in the second aspect, or an apparatus including the network device.

According to a sixth aspect, embodiments of this application provide a communication apparatus, including at least one processor and at least one memory, where the at least one processor is configured to perform the communication method provided in any one of the foregoing aspects. The communication apparatus may be the terminal device in the first aspect, or an apparatus including the terminal device.

Alternatively, the communication apparatus may be the network device in the second aspect, or an apparatus including the network device.

According to a seve$_{nth}$ aspect, embodiments of this application provide a computer-readable storage medium. The computer-readable storage medium stores instructions; and when the instructions are run on a computer, the computer is enabled to perform the communication method in any one of the foregoing aspects.

According to an eighth aspect, embodiments of this application provide a computer program product including instructions; and when the instructions are run on a computer, the computer is enabled to perform the communication method in any one of the foregoing aspects.

According to a ninth aspect, embodiments of this application provide a circuit system. The circuit system includes a processing circuit, and the processing circuit is configured to perform the communication method in any one of the foregoing aspects.

According to a tenth aspect, embodiments of this application provide a chip. The chip includes a processor, and the processor is coupled to a memory. The memory stores program instructions; and when the program instructions stored in the memory are executed by the processor, the communication method in any one of the foregoing aspects is implemented.

According to an eleventh aspect, embodiments of this application provide a communication system, and the communication system includes the terminal device in any one of the foregoing aspects and the network device in any one of the foregoing aspects.

For technical effects brought by any design manner of the second aspect to the eleventh aspect, refer to the technical effects brought by different design manners of the first aspect. Details are not described herein again.

BRIEF DESCRIPTION OF THE DRAWINGS

FIG. 3 is a schematic diagram of time domain resource positions in a candidate time domain resource set according to a related technology;

DETAILED DESCRIPTION OF ILLUSTRATIVE EMBODIMENTS

Figure 1:
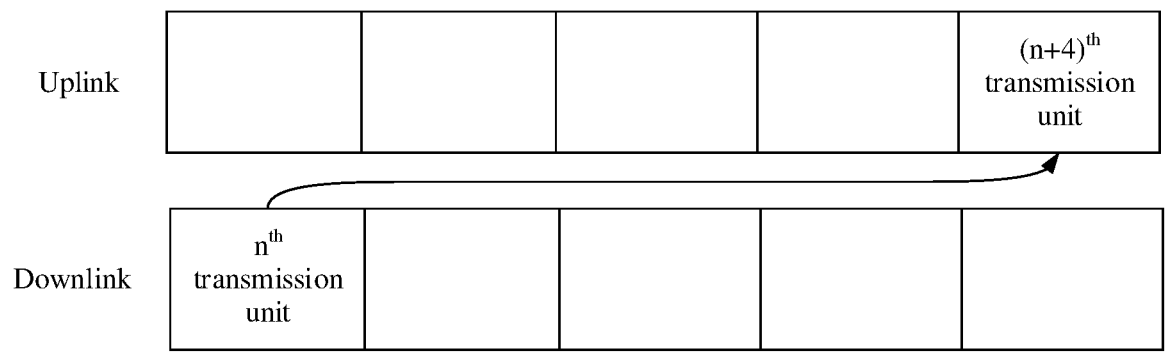
FIG. 1 is a schematic diagram of a position of feedback information according to a related technology.

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example" or "for example" is intended to present a related concept in a specific manner.

First, technical terms used in a related technology are described.

1. A Format of Fallback Downlink Control Information (DCI) is as Follows:

The DCI format may be applicable to data scheduling before a radio resource control (RRC) connection is established, may be applicable to data scheduling in an RRC reconfiguration process, and may be further applicable to data scheduling after the RRC connection is established. A format of uplink fallback DCI is a DCI format 0_0, to be specific, a fallback DCI format used to schedule uplink data may also be denoted as the DCI format 0_0. A format of downlink fallback DCI is a DCI format 1_0, to be specific, a fallback DCI format used to schedule downlink data may also be denoted as the DCI format 1_0.

In addition, when the downlink data is scheduled by using the DCI format 1_0, a time domain resource position of the downlink data needs to be indicated. Specifically, a time domain resource position for scheduling the downlink data is indicated by indicating a row of configuration information in a time domain resource list corresponding to the DCI format 1_0. A manner of determining the time domain resource list corresponding to the DCI format 1_0 is as follows:

If DCI in the DCI format 1_0 is scrambled by using a system information radio network temporary identifier (SI-RNTI), a random access radio network temporary identifier (RA-RNTI), a temporary cell radio network temporary identifier (TC-RNTI), or a paging radio network temporary identifier (P-RNTI); or if the DCI in the DCI format 1_0 is received in a control-resource set (CORESET) 0 and is scrambled by using a cell radio network temporary identifier (C-RNTI), a modulation and coding scheme cell radio network temporary identifier (MCS-C-RNTI), or a CS-RNTI, the time domain resource list corresponding to the DCI format 1_0 is a time domain resource allocation list (time domain allocation list) that is configured by using PDSCH common configuration signaling (PDSCH-configcommon). If no time domain resource allocation list (time domain allocation list) is configured by using the PDSCH common configuration signaling, the time domain resource list corresponding to the DCI format 1_0 is a time domain resource allocation list that is predefined in a protocol.

If the DCI in the DCI format 1_0 is received in a terminal-specific search space (UE-specific search space, USS), or the DCI in the DCI format 1_0 is not received in the CORESET 0, the time domain resource list corresponding to the DCI format 1_0 is a time domain resource allocation list (PDSCH-time domain allocation list) that is configured by using PDSCH configuration signaling (PDSCH-config) and that is used for the DCI format 1_0 and/or a DCI format 1_1.

If no time domain resource allocation list (PDSCH-time domain allocation list) that is used for the DCI format 1_0 and/or the DCI format 1_1 is configured by using the PDSCH configuration signaling (PDSCH-config), the time domain resource list corresponding to the DCI format 1_0 is a time domain resource allocation list (time domain allocation list) that is configured by using the PDSCH common configuration signaling (PDSCH-configcommon). If no time domain resource allocation list (time domain allocation list) is configured by using the PDSCH common configuration signaling (PDSCH-configcommon), the time domain resource list corresponding to the DCI format 1_0 is a time domain resource allocation list that is predefined in a protocol.

In embodiments of this application, the time domain resource allocation list (time domain allocation list) that is configured by using the PDSCH common configuration signaling (PDSCH-configcommon) or the time domain resource allocation list that is predefined in the protocol is denoted as a time domain resource list 0. Configuration information in each row in the time domain resource list 0 is used to indicate a start symbol, a symbol length, and a mapping type of a time domain resource, and the like. All time domain resources indicated by the time domain resource list 0 are described as a first time domain resource set.

2. A Format of Normal DCI is as Follows:

The format of the DCI is a DCI format that is used for data scheduling and that is introduced in new radio (NR) release 15 (R15). A format of uplink normal DCI is a DCI format 0_1, to be specific, a normal DCI format used to schedule uplink data may also be denoted as the DCI format 0_1. A format of downlink normal DCI is a DCI format 1_1, to be specific, a normal DCI format used to schedule downlink data may also be denoted as the DCI format 1_1.

In addition, when the downlink data is scheduled by using the DCI format 1_1, a time domain resource position of the downlink data needs to be indicated. Specifically, a time domain resource position for scheduling the downlink data is indicated by indicating a row of configuration information in a time domain resource list corresponding to the DCI format 1_1. A manner of determining the time domain resource list corresponding to the DCI format 1_1 is as follows:

If a time domain resource allocation list (PDSCH-time domain allocation list) that is used for a DCI format 1_0 and/or the DCI format 1_1 is configured by using PDSCH configuration signaling (PDSCH-config), the time domain resource list corresponding to the DCI format 1_1 is the time domain resource allocation list (PDSCH-time domain allocation list) that is configured by using the PDSCH configuration signaling (PDSCH-config) and that is used for the DCI format 1_0 and/or the DCI format 1_1.

If no time domain resource allocation list (PDSCH-time domain allocation list) that is used for the DCI format 1_0 and/or the DCI format 1_1 is configured by using the PDSCH configuration signaling (PDSCH-config), the time domain resource list corresponding to the DCI format 1_1 is a time domain resource allocation list (time domain allocation list) that is configured by using PDSCH common configuration signaling (PDSCH-configcommon). If no time domain resource allocation list (time domain allocation list) is configured by using the PDSCH common configuration signaling (PDSCH-configcommon), the time domain resource list corresponding to the DCI format 1_1 is a time domain resource allocation list that is predefined in a protocol.

In embodiments of this application, the time domain resource allocation list (PDSCH-time domain allocation list) that is configured by using the PDSCH configuration signaling (PDSCH-config) and that is used for the DCI format 1_0 and/or the DCI format 1_1 is denoted as a time domain resource list 1. Configuration information in each row in the time domain resource list 1 is used to indicate a start symbol, a symbol length, and a mapping type of a time domain resource, and the like. All time domain resources indicated by the time domain resource list 1 are described as a second time domain resource set.

3. A Format of Compact DCI is as Follows:

The format of the DCI is a DCI format that is used for data scheduling and that is newly introduced in NR R16. DCI in this format may have a small quantity of bits, and the quantity of bits is flexibly configured. Therefore, the DCI in this format is more suitable for a high-reliability service. A format of uplink compact DCI is a DCI format 0_2, to be specific, a compact DCI format used to schedule uplink data may also be denoted as the DCI format 0_2. A format of downlink compact DCI is a DCI format 1_2, to be specific, a compact DCI format used to schedule downlink data may also be denoted as the DCI format 1_2.

In addition, when the downlink data is scheduled by using the DCI format 1_2, a time domain resource position of the downlink data needs to be indicated. Specifically, a time domain resource position for scheduling the downlink data is indicated by indicating a row of configuration information in a time domain resource list corresponding to the DCI format 1_2. A manner of determining the time domain resource list corresponding to the DCI format 1_2 is as follows:

If a time domain resource allocation list-for DCI format 1_2 (PDSCH-time domain allocation list-for DCI format 1_2) is configured by using PDSCH configuration signaling (PDSCH-config), the time domain resource list corresponding to the DCI format 1_2 is the time domain resource allocation list-for DCI format 1_2 (PDSCH-time domain allocation list-for DCI format 1_2) that is configured by using the PDSCH configuration signaling (PDSCH-config).

If no time domain resource allocation list-for DCI format 1_2 (PDSCH-time domain allocation list-for DCI format 1_2) is configured by using the PDSCH configuration signaling (PDSCH-config), the time domain resource list corresponding to the DCI format 1_2 is a time domain resource allocation list (PDSCH-time domain allocation list) that is configured by using the PDSCH configuration signaling (PDSCH-config) and that is used for a DCI format 1_0 and/or a DCI format 1_1. If no time domain resource allocation list (PDSCH-time domain allocation list) that is used for the DCI format 1_0 and/or the DCI format 1_1 is configured by using the PDSCH configuration signaling (PDSCH-config), the time domain resource list corresponding to the DCI format 1_2 is a time domain resource allocation list (time domain allocation list) that is configured by using PDSCH common configuration signaling (PDSCH-configcommon). If no time domain resource allocation list (time domain allocation list) is configured by using the PDSCH common configuration signaling (PDSCH-config-common), the time domain resource list corresponding to the DCI format 1_2 is a list that is predefined in a protocol.

In embodiments of this application, the time domain resource allocation list-for DCI format 1_2 (PDSCH-time domain allocation list-for DCI format 1_2) that is configured by using the PDSCH configuration signaling (PDSCH-config) is denoted as a time domain resource list 2. Configuration information in each row in the time domain resource list 2 is used to indicate a start symbol, a symbol length, and a mapping type of a time domain resource, and the like. All time domain resources indicated by the time domain resource list 2 are described as a third time domain resource set.

4. A Hybrid Automatic Repeat Request (HARQ)-Acknowledgement (ACK) Codebook is as Follows:

After receiving downlink data carried on a physical downlink shared channel (PDSCH), a terminal device feeds back a HARQ response message to a network device. Each HARQ response message corresponds to values of a group of bits, to represent a PDSCH receiving status of the terminal device on a receiving occasion of a corresponding candidate PDSCH. In a time unit, consecutive bits including HARQ response messages of different PDSCHs are referred to as a HARQ-ACK codebook. The time unit may be a slot, a mini-slot, or a sub-slot.

5. A Semi-Static Codebook Mode is as Follows:

In the semi-static codebook mode, a size of a HARQ-ACK codebook is semi-static. To be specific, in a specific time period, if the size of the HARQ-ACK codebook is not configured by using RRC signaling, the size of the HARQ-ACK codebook remains unchanged. In this way, reliability of the HARQ-ACK codebook is high.

6. Higher Layer Signaling is as Follows:

The higher layer signaling is signaling sent by a higher protocol layer. The higher protocol layer is at least one protocol layer above a physical layer. The higher protocol layer includes at least one of the following protocol layers: a medium access control (MAC) layer, a radio link control (RLC) layer, a packet data convergence protocol (PDCP) layer, a radio resource control (RRC) layer, and a non-access stratum (NAS).

7. A Slot is as Follows:

The slot is a time domain unit for data scheduling. When a normal cyclic prefix is used, one slot includes 14 symbols. When an extended cyclic prefix is used, one slot includes 12 symbols. In fifth-generation (5G) NR, there may be a plurality of types of time units. For example, a time unit may be a frame, a subframe, a slot, or a symbol. The symbol herein may be an orthogonal frequency division multiplexing (OFDM) symbol. A time length of one frame is 10 ms, including 10 subframes. A time length corresponding to each subframe is 1 ms. In different subcarrier spacing configurations, quantities of slots included in the subframes are different.

The following describes a generation process of a HARQ-ACK codebook in a semi-static codebook mode in a related technology.

Step 1: A network device sends DCI to a terminal device. Accordingly, the terminal device receives the DCI from the network device.

A DCI format includes at least one of the following formats: a DCI format 1_0, a DCI format 1_1, or a DCI format 1_2.

The DCI includes time domain resource indication information. The time domain resource indication information in the DCI is carried in a bit field in the DCI. The time domain resource indication information in the DCI may be a row index that is used to index a row in a target time domain resource allocation list. Herein, the target time domain resource allocation list is determined based on the DCI format of the DCI. For a manner of determining a target time domain resource allocation list corresponding to the DCI format 1_0, refer to related descriptions of "a manner of determining the time domain resource list corresponding to the DCI format 1_0". For a manner of determining a target time domain resource allocation list corresponding to the DCI format 1_1, refer to related descriptions of "a manner of determining the time domain resource list corresponding to the DCI format 1_1". For a manner of determining a target time domain resource allocation list corresponding to the DCI format 1_2, refer to related descriptions of "a manner of determining the time domain resource list corresponding to a DCI format 1_2". Details are not described herein again.

The DCI includes K1 indication information. The K1 indication information is used to indicate a correspondence between a time unit for receiving a PDSCH and a time unit for feeding back a HARQ response message. A value of K1 is a value in a K1 set. For example, if the K1 set is $\{1, 2, 3, 4, 5, 6, 7, 8\}$, and three bits in the DCI are "011", the value of K1 is 4. In this case, if the terminal device receives the PDSCH in an $n^{th}$ time unit, the terminal device feeds back the HARQ response message to the terminal device in an $(n+K1)^{th}$ time unit. Details are shown in FIG. 1. "n" is a positive integer greater than or equal to 1. Herein, the time unit may be a slot, a mini-slot, or a sub-slot.

Step 2: The terminal device determines a time domain resource position of the PDSCH based on the time domain resource indication information in the DCI.

For example, the terminal device determines a time domain resource allocation list corresponding to the DCI format of the DCI, obtains, through indexing based on the time domain resource indication information in the DCI, a corresponding row in the time domain resource allocation list corresponding to the DCI format of the DCI, and uses a time domain resource position indicated by the corresponding row in the time domain resource allocation list corresponding to the DCI format of the DCI as the time domain resource position of the PDSCH.

Step 3: The network device sends the PDSCH to the terminal device at the time domain resource position of the PDSCH. Accordingly, the terminal device receives the PDSCH from the network device at the time domain resource position of the PDSCH.

Step 4: The terminal device determines, based on the K1 indication information in the DCI and the time domain resource position of the PDSCH, a time domain resource position for feeding back the HARQ response message.

The HARQ response message is determined based on a decoding result of downlink data carried on the PDSCH. Specifically, if the downlink data is successfully received, the HARQ response information is an acknowledgement (ACK); or if the downlink data fails to be received, the HARQ response information is a negative acknowledgement (NACK).

In the semi-static codebook mode, the terminal device generates one HARQ-ACK codebook based on a plurality of HARQ response messages. A generation process of the HARQ-ACK codebook in an $i^{th}$ slot is used as an example for description.

Figure 2:
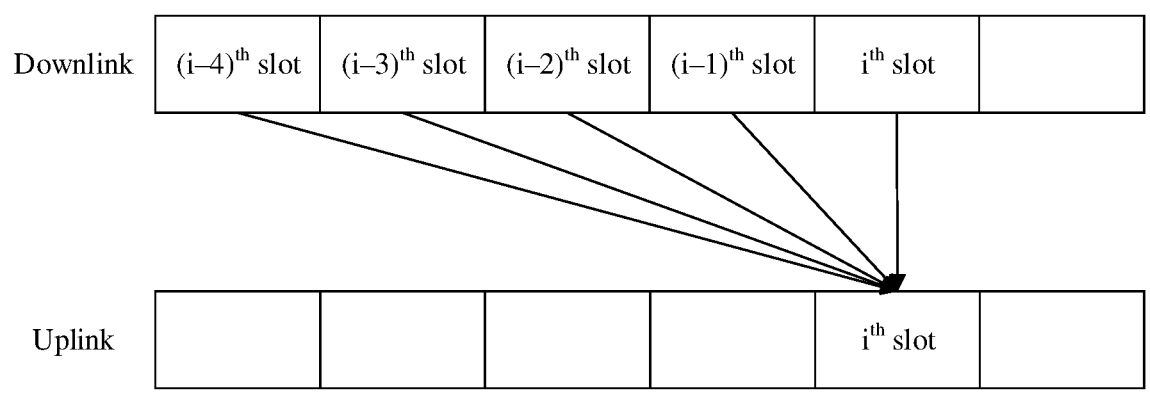
FIG. 2 is another schematic diagram of a position of feedback information according to a related technology.

When a K1 set is {0, 1, 2, 3, 4}, a HARQ response message may be fed back in the $i^{th}$ slot for downlink data transmitted in an $(i-4)^{th}$ slot, an $(i-3)^{th}$ slot, an $(i-2)^{th}$ slot, an $(i-1)^{th}$ slot, and the $i^{th}$ slot, as shown in FIG. 2. If one piece of DCI is received in the $(i-4)^{th}$ slot, the $(i-3)^{th}$ slot, the $(i-2)^{th}$ slot, the $(i-1)^{th}$ slot, and the $i^{th}$ slot, to indicate that the HARQ response message is fed back in the $i^{th}$ slot, HARQ response messages corresponding to the $(i-4)^{th}$ slot, the $(i-3)^{th}$ slot, the $(i-2)^{th}$ slot, the $(i-1)^{th}$ slot, and the $i^{th}$ slot, all need to be fed back in the $i^{th}$ slot.

Herein, a specific process in which the terminal device determines a quantity of to-be-fed-back bits in each slot includes the following step 5 and step 6.

Step 5: The terminal device determines a candidate time domain resource set.

Specifically, in a case in which no time domain resource allocation list (PDSCH-time domain allocation list) that is used for the DCI format 1_0 and/or the DCI format 1_1 is configured by using PDSCH configuration signaling (PDSCH-config), the candidate time domain resource set is a first time domain resource set. When the time domain resource allocation list (PDSCH-time domain allocation list) that is used for the DCI format 1_0 and/or the DCI format 1_1 is configured by using the PDSCH configuration signaling (PDSCH-config), the candidate time domain resource set is a union set of the first time domain resource set and a second time domain resource set. Herein, after union set processing, if the first time domain resource set and the second time domain resource set include a same time domain resource position, the candidate time domain resource set includes only one same time domain resource position.

Step 6: The terminal device determines the HARQ-ACK codebook based on the candidate time domain resource set.

Specifically, it is first determined, starting from a candidate time domain resource position having a foremost start symbol in the candidate time domain resource set, whether there is another candidate time domain resource position overlapping with the candidate time domain resource position having the foremost start symbol. If there is the another candidate time domain resource position overlapping with the candidate time domain resource position having the foremost start symbol, all candidate time domain resource positions overlapping with the candidate time domain resource position having the foremost start symbol are classified as a first candidate PDSCH receiving occasion. Then, a second candidate PDSCH receiving occasion is determined in a remaining candidate time domain resource position in the candidate time domain resource set according to the foregoing process. This process repeats until there is no remaining candidate time domain resource position. When each candidate PDSCH receiving occasion corresponds to a preset quantity of bits, a quantity of bits that is in the HARQ-ACK codebook and that corresponds to the slot can be determined. In addition, a bit sequence in the HARQ-ACK codebook is arranged based on a sequence of candidate PDSCH receiving occasions.

For example, the candidate time domain resource set includes four candidate time domain resource positions: a symbol 1 to a symbol 3, the symbol 2 to a symbol 5, the symbol 5 to a symbol 9, and a symbol 11 to a symbol 13, which are specifically shown by grids filled with slashes in FIG. 3. First, a first candidate time domain resource position (namely, the symbol 1 to the symbol 3) overlaps a second candidate time domain resource position (namely, the symbol 2 to the symbol 5). Therefore, the first candidate time domain resource position and the second candidate time domain resource position correspond to the first candidate PDSCH receiving occasion. Then, remaining candidate time domain resource positions are a third candidate time domain resource position (namely, the symbol 5 to the symbol 9) and a fourth candidate time domain resource position (namely, the symbol 11 to the symbol 13), and the two do not overlap. Therefore, the third candidate time domain resource position corresponds to the second candidate PDSCH receiving occasion, and the fourth candidate time domain resource position corresponds to a third candidate PDSCH receiving occasion. If each candidate PDSCH receiving occasion corresponds to one bit, a HARQ response message in the slot is three-bit feedback information in the HARQ-ACK codebook.

The terminal device may repeat step 5 and step 6, to determine a quantity of bits that is in the HARQ-ACK codebook and that is fed back in the $i^{th}$ slot for each of the $(i-4)^{th}$ slot, the $(i-3)^{th}$ slot, the $(i-2)^{th}$ slot, the $(i-1)^{th}$ slot, and the $i^{th}$ slot, and a bit that is in the HARQ-ACK codebook and that corresponds to each time domain resource position.

However, currently, there are three DCI formats, and time domain resource allocation lists corresponding to the three DCI formats may be completely different. For example, a time domain resource list corresponding to the DCI format 1_0 is a time domain resource list 0, a time domain resource list corresponding to the DCI format 1_1 is a time domain resource list 1, and a time domain resource list corresponding to the DCI format 1_2 is a time domain resource list 2. In a semi-static codebook determining process, the candidate time domain resource set may be the first time domain resource set (namely, a time domain resource indicated by the time domain resource list 0), or may be the union set of the first time domain resource set and the second time domain resource set (namely, a time domain resource indicated by the time domain resource list 1). To be specific, if a third time domain resource set (namely, a time domain resource indicated by the time domain resource list 2) is not referenced during determining of the candidate time domain resource set, the candidate time domain resource set does not include the third time domain resource set (namely, the time domain resource indicated by the time domain resource list 2). Therefore, the HARQ-ACK codebook determined by the terminal device does not include a feedback position of the PDSCH received at the time domain resource position indicated by the time domain resource list 2. Consequently, there is no feedback position for downlink data scheduled by using the DCI format 1_2; and when data is transmitted at a corresponding time domain resource position, data transmission reliability is affected because the network device cannot receive a corresponding HARQ response message. Alternatively, because the network device does not receive feedback information of downlink data scheduled on the time domain resource, the network device cannot transmit the data at the corresponding time domain resource position. Consequently, data scheduling flexibility is reduced and transmission resources are wasted.

Figure 4:
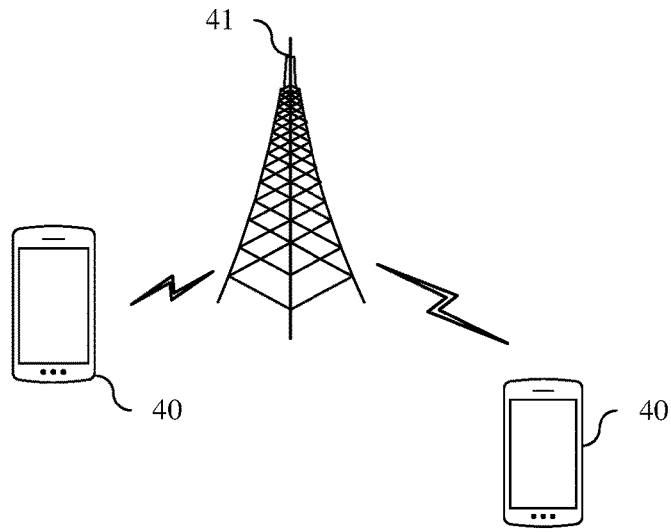
FIG. 4 is a schematic diagram of an architecture of a communication network according to an embodiment of this application.

In view of this, embodiments of this application provide a communication method. The communication method in embodiments of this application is applicable to various communication systems. The communication method provided in embodiments of this application may be applied to a long term evolution (LTE) system, a fifth-generation (5G) communication network, another similar network, or another future network. FIG. 4 is a schematic diagram of an architecture of a communication system to which the communication method according to embodiments of this application is applicable. The communication system may include a terminal device 40 and a network device 41. The terminal device 40 is wirelessly connected to the network device 41. There may be one or more terminal devices 40, and there may be one or more network devices 41. FIG. 4 shows only one network device and two terminal devices. FIG. 4 is merely a schematic diagram, and does not constitute any limitation on an application scenario of the communication method in embodiments of this application.

The terminal device 40, also referred to as user equipment (UE), a mobile station (MS), a mobile terminal (MT), or the like, is a device that provides a voice/data connectivity for a user, for example, a handheld device or a vehicle-mounted device having a wireless connection function. The terminal device may be specifically a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, a terminal device in a future 5G communication network or a communication network after 5G, or the like. This is not limited in embodiments of this application.

The network device 41 is a device in a wireless communication network, for example, a radio access network (RAN) node that connects the terminal device 40 to the wireless communication network. Currently, some RAN nodes are, for example, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), a network side device in a future 5G communication network or a communication network after 5G, or the like.

The communication system and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as a network architecture evolves and a new service scenario emerges.

The following describes in detail the communication method provided in embodiments of this application.

It should be noted that in the following embodiments of this application, names of messages between network elements, names of parameters in messages, or the like are merely examples, and may be other names during specific implementation. This is uniformly described herein, and details are not described below again.

Figure 5:
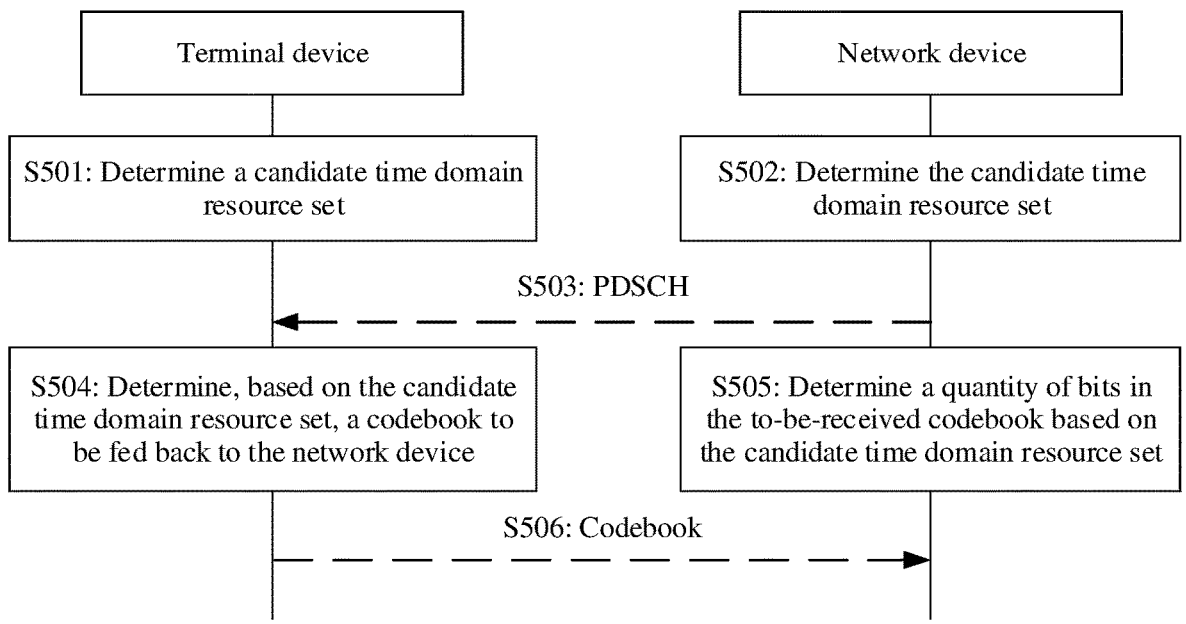
FIG. 5 is a schematic flowchart of a communication method according to an embodiment of this application.

Embodiments of this application provide a communication method, and the communication method is applied to a generation process of a semi-static codebook. Refer to FIG. 5. The communication method includes the following steps.

S501: A terminal device determines a candidate time domain resource set.

The candidate time domain resource set includes at least one of the following three time domain resource sets: a first time domain resource set, a second time domain resource set, or a third time domain resource set. When the candidate time domain resource set includes one time domain resource set, the candidate time domain resource set is a corresponding time domain resource set. When the candidate time domain resource set includes a plurality of time domain resource sets, the candidate time domain resource set is a union set of the plurality of time domain resource sets.

S502: A network device determines the candidate time domain resource set.

Herein, for a specific implementation of S502, refer to related descriptions of S501, that is, the network device performs a related processing process. Details are not described herein again. Because the network device and the terminal device determine the candidate time domain resource set by using a same processing process, it can be ensured that candidate time domain resource sets determined by the network device and the terminal device are the same.

S503: The network device transmits a PDSCH to the terminal device at a time domain resource position indicated by the candidate time domain resource set. Accordingly, the terminal device receives the PDSCH from the network device at the time domain resource position indicated by the candidate time domain resource set.

There may be one or more PDSCHs.

S504: The terminal device determines, based on the candidate time domain resource set, a codebook to be fed back to the network device.

The codebook includes feedback information of the one or more PDSCHs. The codebook is a HARQ-ACK codebook.

Herein, for a specific implementation process of S504, refer to related descriptions of step 6. Details are not described herein again.

S505: The network device determines a quantity of bits in the to-be-received codebook based on the candidate time domain resource set.

Herein, the codebook is still the HARQ-ACK codebook. For a specific implementation process of S505, refer to the related descriptions of step 6. Details are not described herein again. Because the candidate time domain resource sets determined by the network device and the terminal device are the same, when the processing process in step 6 is also used, the quantity of bits that is in the codebook and that is determined by the network device is consistent with a quantity of bits in the codebook determined by the terminal device, so that the network device determines a size of a transmission resource used for receiving the codebook, to improve transmission resource utilization. The network device can determine only the quantity of bits in the codebook, but still does not learn of a value status of a corresponding bit in the codebook. In other words, the network device does not learn of the feedback information of the one or more PDSCHs. To enable the network device to obtain the feedback information of the one or more PDSCHs, the terminal device performs S506.

S506: The terminal device sends the codebook to the network device. Accordingly, the network device receives the codebook from the terminal device.

It should be noted that the terminal device may first perform S503 and then perform S504, may first perform S504 and then perform S503, or may simultaneously perform S503 and S504. A sequence of performing S503 and S504 is not limited in this embodiment of this application. The terminal device may first perform S503 and then perform S505, may first perform S505 and then perform S503, or may simultaneously perform S503 and S505. A sequence of performing S503 and S505 is not limited in this embodiment of this application.

According to the communication method provided in this embodiment of this application, the candidate time domain resource set determined by the terminal device can include a newly added time domain resource set, namely, the third time domain resource set. In this way, the candidate time domain resource set can include all possible time domain resource sets. When the candidate time domain resource set includes the third time domain resource set, the codebook can include the feedback information of the PDSCH at a time domain resource position indicated by the third time domain resource set. When the candidate time domain resource set does not include the third time domain resource set, no PDSCH is transmitted at the time domain resource position indicated by the third time domain resource set. Accordingly, the codebook does not include the feedback information of the PDSCH at the time domain resource position indicated by the third time domain resource set. In this way, it can be ensured that the codebook includes feedback information corresponding to all possible time domain resource positions, to improve data transmission reliability. When the codebook includes the feedback information corresponding to all the possible time domain resource positions, data can be transmitted at all the possible time domain resource positions, to improve data scheduling flexibility and resource utilization.

Figure 6:
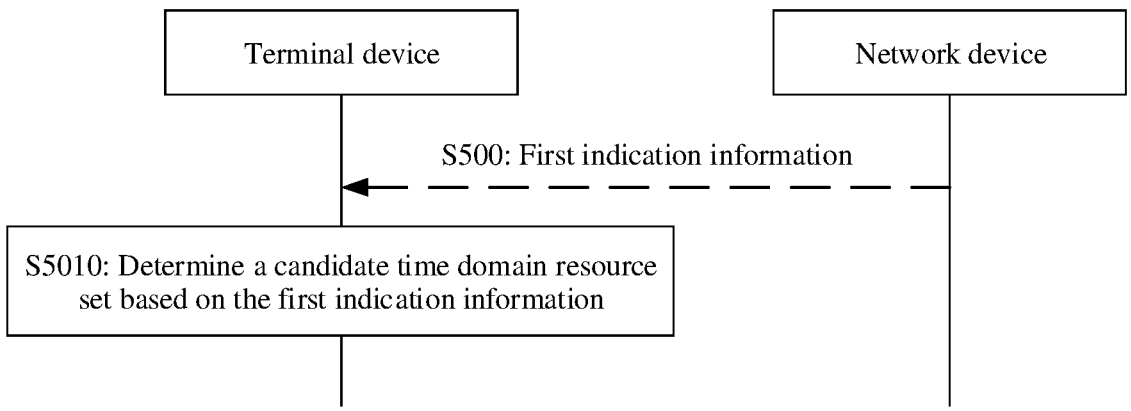
FIG. 6 is another schematic flowchart of a communication method according to an embodiment of this application.

In some embodiments, the terminal device determines the candidate time domain resource set based on received first indication information. Refer to FIG. 6. The communication method provided in embodiments of this application further includes S500.

S500: The network device sends the first indication information to the terminal device. Accordingly, the terminal device receives the first indication information from the network device.

There may be a plurality of specific implementations of the first indication information. The first indication information may be PDSCH configuration signaling (PDSCH-config), to be specific, the first indication information may include configuration information of the second time domain resource set and/or configuration information of the third time domain resource set, or the first indication information may include neither the configuration information of the second time domain resource set nor the configuration information of the third time domain resource set. The first indication information may alternatively be one or more pieces of DCI. The first indication information may alternatively be a DCI format of the DCI or DCI formats of the plurality of pieces of DCI.

S501 may be specifically implemented as S5010.

S5010: The terminal device determines the candidate time domain resource set based on the first indication information.

Herein, there are a plurality of specific implementations of the first indication information. Accordingly, manners in which the terminal device determines the candidate time domain resource set based on the first indication information are also different. The manners may be, for example, but are not limited to the following four manners:

Manner 1: The first indication information is the PDSCH configuration signaling (PDSCH-config).

For example, the first indication information may include the configuration information of the second time domain resource set and/or the configuration information of the third time domain resource set, or the first indication information may include neither the configuration information of the second time domain resource set nor the configuration information of the third time domain resource set. Specifically, the following four cases are included. In different cases, the candidate time domain resource set determined by the terminal device is as follows:

Case 1: The first indication information includes the configuration information of the third time domain resource set, and the terminal device determines that the candidate time domain resource set is a union set of the first time domain resource set and the third time domain resource set. In other words, the first indication information does not include the configuration information of the second time domain resource set.

Case 2: If the first indication information includes the configuration information of the second time domain resource set and the configuration information of the third time domain resource set, the terminal device determines that the candidate time domain resource set is a union set of the first time domain resource set, the second time domain resource set, and the third time domain resource set.

Case 3: If the first indication information includes the configuration information of the second time domain resource set, but does not include the configuration information of the third time domain resource set, the terminal device determines that the candidate time domain resource set is a union set of the first time domain resource set and the second time domain resource set.

Case 4: The terminal device determines that the candidate time domain resource set is the first time domain resource set. In other words, the first indication information includes neither the configuration information of the second time domain resource set nor the configuration information of the third time domain resource set.

It should be noted that the first time domain resource set is a time domain resource indicated in a time domain resource list 0. The time domain resource list 0 is a time domain resource allocation list (time domain allocation list) that is configured by using PDSCH common configuration signaling (PDSCH-configcommon), or the time domain resource list 0 is a time domain resource allocation list that is predefined in a protocol. In this case, the terminal device determines that the time domain resource allocation list 0 always exists, in other words, the first time domain resource set always exists.

In the case 1 and the case 2, if the first indication information includes the configuration information of the third time domain resource, the candidate time domain resource set includes a time domain resource in the third time domain resource set. In the case 3 and the case 4, the terminal device references the third time domain resource set when determining the candidate time domain resource set. If the first indication information does not include the configuration information of the third time domain resource set, the candidate time domain resource set does not include the time domain resource in the third time domain resource set, and the terminal device does not need to transmit the feedback information of the PDSCH at the time domain resource position indicated by the third time domain resource set. However, in a current technology, the candidate time domain resource set may not include the time domain resource in the third time domain resource set. However, in the current technology, the third time domain resource set is not referenced when the candidate time domain resource set is determined, instead of that the first indication information in embodiments of this application does not include the configuration information of the third time domain resource. In this way, when the terminal device determines the candidate time domain resource set with reference to a configuration status of the third time domain resource set, even if the candidate time domain resource set does not include the third time domain resource set, there is no omission of a possible time domain resource position, to ensure that the codebook can include the feedback information of the PDSCH at all possible time domain resource positions, and to ensure transmission reliability and improve resource utilization.

Manner 2: The first indication information is the one or more pieces of DCI.

For example, a specific implementation of S5010 is as follows: The terminal device determines the candidate time domain resource set based on the DCI format of the DCI or the DCI formats of the plurality of pieces of DCI.

The one or more pieces of DCI may have a same DCI format or may have different DCI formats. The DCI format may be at least one of the following three formats: DCI in a DCI format 1_0, DCI in a DCI format 1_1, or DCI in a DCI format 1_2.

Herein, the terminal device first determines the DCI format of the DCI or the DCI formats of the plurality of pieces of DCI, and then determines a time domain resource set corresponding to the corresponding DCI format. For details, refer to related descriptions of "a manner of determining the time domain resource list corresponding to the DCI format 1_0", "a manner of determining the time domain resource list corresponding to the DCI format 1_1", and "a manner of determining the time domain resource list corresponding to the DCI format 1_2". Details are not described herein again. The terminal device can determine the candidate time domain resource set only after determining the time domain resource set corresponding to the corresponding DCI format. Specifically, examples may be, for example, but not limited to the following two examples:

Example 1: If the DCI format of the DCI or the DCI formats of the plurality of pieces of DCI is/are a first DCI format/first DCI formats, the terminal device determines that the candidate time domain resource set is a time domain resource set corresponding to the first DCI format/first DCI formats; or if the DCI formats of the plurality of pieces of DCI are second DCI formats, and there are a plurality of second DCI formats, the terminal device determines that the candidate time domain resource set is a union set of a plurality of time domain resource sets corresponding to the second DCI formats.

The first DCI format is any DCI format. For example, the first DCI format is the DCI format 1_0, the first DCI format is the DCI format 1_1, or the first DCI format is the DCI format 1_2.

The second DCI formats are a plurality of DCI formats. For example, the second DCI formats are the DCI format 1_0 and the DCI format 1_1, the second DCI formats are the DCI format 1_0 and the DCI format 1_2, the second DCI formats are the DCI format 1_1 and the DCI format 1_2, or the second DCI formats are the DCI format 1_0, the DCI format 1_1, and the DCI format 1_2.

In this way, regardless of whether there are one or more DCI formats, the terminal device can determine the candidate time domain resource set based on a corresponding DCI format. Because the candidate time domain resource set can include a time domain resource set corresponding to a corresponding DCI format, there is no omission of a time domain resource position corresponding to a DCI format, to ensure that the codebook can include the feedback information of the PDSCH at all possible time domain resource positions, and to ensure reliability and improve resource utilization. In addition, the candidate time domain resource set can include the time domain resource set corresponding to the corresponding DCI format, but does not include all time domain resource sets. Therefore, the quantity of bits in the codebook is correspondingly reduced, and transmission resource overheads are reduced, to further ensure transmission reliability.

Example 2: The DCI format of the DCI or the DCI formats of the plurality of pieces of DCI includes/include a third DCI format. In other words, the DCI format of the DCI or the DCI formats of the plurality of pieces of DCI does/do not include a fourth DCI format. The terminal device determines that the candidate time domain resource set is a union set of a time domain resource set corresponding to the third DCI format and the first time domain resource set. Alternatively, the DCI format of the DCI or the DCI formats of the plurality of pieces of DCI includes/include the fourth DCI format. In other words, the DCI format of the DCI or the DCI formats of the plurality of pieces of DCI does/do not include the third DCI format. The terminal device determines that the candidate time domain resource set is a union set of a time domain resource set corresponding to the fourth DCI format and the first time domain resource set. Alternatively, if the DCI formats of the plurality of pieces of DCI include the third DCI format and the fourth DCI format, the terminal device determines that the candidate time domain resource set is a union set of the time domain resource set corresponding to the third DCI format, the time domain resource set corresponding to the fourth DCI format, and the first time domain resource set. Alternatively, if the DCI format of the DCI or the DCI formats of the plurality of pieces of DCI includes/include neither the third DCI format nor the fourth DCI format, the terminal device determines that the candidate time domain resource set is the first time domain resource set.

The third DCI format is the DCI format 1_2, and the fourth DCI format is the DCI format 1_1.

In this way, regardless of whether the DCI format includes the third DCI format, the terminal device can determine a corresponding candidate time domain resource set. Because the third DCI format is referenced in a process of determining the candidate time domain resource set, there is no omission of a time domain resource position corresponding to the third DCI format, to ensure that the codebook can include the feedback information of the PDSCH at all possible time domain resource positions, and to ensure transmission reliability.

Manner 3: The first indication information is used to indicate the DCI format of the DCI or the DCI formats of the plurality of pieces of DCI.

For example, a specific implementation of S5010 is as follows: The terminal device determines the candidate time domain resource set based on the DCI format of the DCI or the DCI formats of the plurality of pieces of DCI.

The one or more pieces of DCI may have a same DCI format or may have different DCI formats. The DCI format may be at least one of the following three formats: the DCI format 1_0, the DCI format 1_1, or the DCI format 1_2.

The first indication information may be carried in higher layer signaling, and is used to indicate a DCI format that needs to be received by the terminal device.

Herein, for "the terminal device determines the candidate time domain resource set based on the DCI format of the DCI or the DCI formats of the plurality of pieces of DCI", refer to related descriptions in Manner 2. Details are not described herein again.

In this way, when the first indication information indicates the DCI format of the DCI or the DCI formats of the plurality of pieces of DCI, because the first indication information can indicate the DCI format, the terminal device determines, based on different DCI formats, the candidate time domain resource set, and the candidate time domain resource set can include a time domain resource set corresponding to a corresponding DCI format. Therefore, there is no omission of a time domain resource position corresponding to a DCI format, to ensure that the codebook can include the feedback information of the PDSCH at all possible time domain resource positions, to ensure transmission reliability.

In addition, in some embodiments, the terminal device further needs to receive second indication information, where the second indication information is used to indicate that a codebook generation mode is a semi-static codebook mode. The terminal device generates the HARQ-ACK codebook in the semi-static codebook mode. Accordingly, the network device determines a quantity of bits in the HARQ-ACK codebook in the semi-static codebook mode.

The foregoing mainly describes the solutions provided in embodiments of this application from the perspective of interaction between network elements. Accordingly, embodiments of this application further provide a communication apparatus. The communication apparatus may be the network element in the foregoing method embodiments, or an apparatus including the foregoing network element, or a component that can be used in the network element. It may be understood that, to implement the foregoing functions, the communication apparatus includes a corresponding hardware structure and/or software module for performing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of technical solutions. A person skilled in the art may use different methods to implement the described functions for each particular application, but it should not be considered that the implementation goes beyond the scope of this application.

Figure 7:
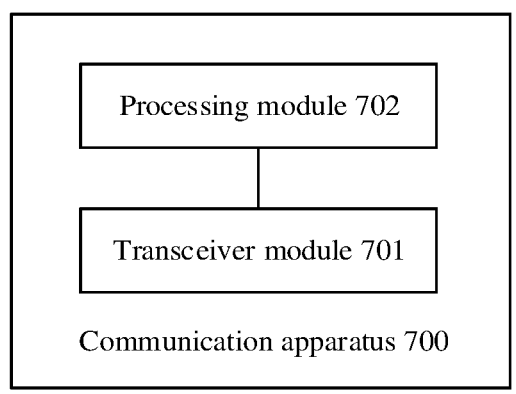
FIG. 7 is a schematic diagram of a structure of a communication apparatus according to an embodiment of this application.

FIG. 7 is a schematic diagram of a structure of a communication apparatus 700. The communication apparatus 700 includes a transceiver module 701 and a processing module 702.

For example, the communication apparatus 700 is the terminal device in FIG. 5 in the foregoing method embodiment.

The processing module 702 is configured to determine a candidate time domain resource set. The processing module 702 is further configured to determine, based on the candidate time domain resource set, a codebook to be fed back to a network device. The codebook includes feedback information of one or more physical downlink shared channels PDSCHs, and the one or more PDSCHs are transmitted by using a time domain resource position indicated by the candidate time domain resource set. The transceiver module 701 is configured to send the codebook to the network device.

In a possible design, the transceiver module 701 is further configured to receive indication information from the network device. That the processing module 702 is configured to determine a candidate time domain resource set includes: The processing module 702 is configured to determine the candidate time domain resource set based on the indication information.

In a possible design, a first time domain resource set is a preset time domain resource set. That the processing module 702 is configured to determine the candidate time domain resource set based on the indication information includes: If the indication information does not include configuration information of a second time domain resource set, but includes configuration information of a third time domain resource set, the processing module 702 is configured to determine that the candidate time domain resource set is a union set of the first time domain resource set and the third time domain resource set. Alternatively, if the indication information includes the configuration information of the second time domain resource set and the configuration information of the third time domain resource set, the processing module 702 is configured to determine that the candidate time domain resource set is a union set of the first time domain resource set, the second time domain resource set, and the third time domain resource set. Alternatively, if the indication information includes neither the configuration information of the second time domain resource set nor the configuration information of the third time domain resource set, the processing module 702 is configured to determine that the candidate time domain resource set is the first time domain resource set. Alternatively, if the indication information includes the configuration information of the second time domain resource set, but does not include the configuration information of the third time domain resource set, the processing module 702 is configured to determine that the candidate time domain resource set is a union set of the first time domain resource set and the third time domain resource set.

In a possible design, the indication information is one or more pieces of DCI. That the processing module 702 is configured to determine the candidate time domain resource set based on the indication information includes: The processing module 702 is configured to determine the candidate time domain resource set based on a DCI format of the DCI or DCI formats of the plurality of pieces of DCI.

In a possible design, the indication information is used to indicate a DCI format of one piece of DCI or DCI formats of a plurality of pieces of DCI. That the processing module 702 is configured to determine the candidate time domain resource set based on the indication information includes: The processing module 702 is configured to determine the candidate time domain resource set based on the DCI format of the DCI or the DCI formats of the plurality of pieces of DCI.

In a possible design, that the processing module 702 is configured to determine the candidate time domain resource set based on the DCI format of the DCI or the DCI formats of the plurality of pieces of DCI includes: If the DCI format of the DCI or the DCI formats of the plurality of pieces of DCI is/are a first DCI format/first DCI formats, the processing module 702 is configured to determine that the candidate time domain resource set is a time domain resource set corresponding to the first DCI format/first DCI formats. Alternatively, if the DCI formats of the plurality of pieces of DCI are second DCI formats, and there are a plurality of second DCI formats, the processing module 702 is configured to determine that the candidate time domain resource set is a union set of a plurality of time domain resource sets corresponding to the second DCI formats.

In a possible design, the first time domain resource set is a preset time domain resource set. That the processing module 702 is configured to determine the candidate time domain resource set based on the DCI format of the DCI or the DCI formats of the plurality of pieces of DCI includes: If the DCI format of the DCI or the DCI formats of the plurality of pieces of DCI includes/include a third DCI format, but does/do not include a fourth DCI format, the processing module 702 is configured to determine that the candidate time domain resource set is a union set of a time domain resource set corresponding to the third DCI format and the first time domain resource set. Alternatively, if the DCI format of the DCI or the DCI formats of the plurality of pieces of DCI does/do not include the third DCI format, but includes/include the fourth DCI format, the processing module 702 is configured to determine that the candidate time domain resource set is a union set of a time domain resource set corresponding to the fourth DCI format and the first time domain resource set. Alternatively, if the DCI formats of the plurality of pieces of DCI include the third DCI format and the fourth DCI format, the processing module 702 is configured to determine that the candidate time domain resource set is a union set of the time domain resource set corresponding to the third DCI format, the time domain resource set corresponding to the fourth DCI format, and the first time domain resource set. Alternatively, if the DCI format of the DCI or the DCI formats of the plurality of pieces of DCI includes/include neither the third DCI format nor the fourth DCI format, the processing module 702 is configured to determine that the candidate time domain resource set is the first time domain resource set.

For example, the communication apparatus 700 is the network device in FIG. 5 in the foregoing method embodiment.

The processing module 702 is configured to determine a candidate time domain resource set. The processing module 702 is further configured to determine, based on the candidate time domain resource set, a quantity of bits in a to-be-received codebook from a terminal device. The codebook includes feedback information of one or more physical downlink shared channels PDSCHs, and the one or more PDSCHs are transmitted by using a time domain resource position indicated by the candidate time domain resource set. The transceiver module 701 is configured to receive the codebook from the terminal device.

In a possible design, the transceiver module 701 is further configured to send indication information to the terminal device. That the processing module 702 is configured to determine a candidate time domain resource set includes: The processing module 702 is configured to determine the candidate time domain resource set based on the indication information.

In a possible design, a first time domain resource set is a preset time domain resource set. That the processing module 702 is configured to determine the candidate time domain resource set based on the indication information includes: If the indication information does not include configuration information of a second time domain resource set, but includes configuration information of a third time domain resource set, the processing module 702 is configured to determine that the candidate time domain resource set is a union set of the first time domain resource set and the third time domain resource set. Alternatively, if the indication information includes the configuration information of the second time domain resource set and the configuration information of the third time domain resource set, the processing module 702 is configured to determine that the candidate time domain resource set is a union set of the first time domain resource set, the second time domain resource set, and the third time domain resource set. Alternatively, if the indication information includes neither the configuration information of the second time domain resource set nor the configuration information of the third time domain resource set, the processing module 702 is configured to determine that the candidate time domain resource set is the first time domain resource set. Alternatively, if the indication information includes the configuration information of the second time domain resource set, but does not include the configuration information of the third time domain resource set, the processing module 702 is configured to determine that the candidate time domain resource set is a union set of the first time domain resource set and the third time domain resource set.

In a possible design, the indication information is one or more pieces of DCI. That the processing module 702 is configured to determine the candidate time domain resource set based on the indication information includes: The processing module 702 is configured to determine the candidate time domain resource set based on a DCI format of the DCI or DCI formats of the plurality of pieces of DCI.

In a possible design, the indication information is used to indicate a DCI format of one piece of DCI or DCI formats of a plurality of pieces of DCI. That the processing module 702 is configured to determine the candidate time domain resource set based on the indication information includes: The processing module 702 is configured to determine the candidate time domain resource set based on the DCI format of the DCI or the DCI formats of the plurality of pieces of DCI.

In a possible design, that the processing module 702 is configured to determine the candidate time domain resource set based on the DCI format of the DCI or the DCI formats of the plurality of pieces of DCI includes: If the DCI format of the DCI or the DCI formats of the plurality of pieces of DCI is/are a first DCI format/first DCI formats, the processing module 702 is configured to determine that the candidate time domain resource set is a time domain resource set corresponding to the first DCI format/first DCI formats. Alternatively, if the DCI formats of the plurality of pieces of DCI are second DCI formats, and there are the plurality of second DCI formats, the processing module 702 is configured to determine that the candidate time domain resource set is a union set of a plurality of time domain resource sets corresponding to the second DCI formats.

In a possible design, the first time domain resource set is a preset time domain resource set. That the processing module 702 is configured to determine the candidate time domain resource set based on the DCI format of the DCI or the DCI formats of the plurality of pieces of DCI includes: If the DCI format of the DCI or the DCI formats of the plurality of pieces of DCI includes/include a third DCI format, but does/do not include a fourth DCI format, the processing module 702 is configured to determine that the candidate time domain resource set is a union set of a time domain resource set corresponding to the third DCI format and the first time domain resource set. Alternatively, if the DCI format of the DCI or the DCI formats of the plurality of pieces of DCI does/do not include the third DCI format, but includes/include the fourth DCI format, the processing module 702 is configured to determine that the candidate time domain resource set is a union set of a time domain resource set corresponding to the fourth DCI format and the first time domain resource set. Alternatively, if the DCI formats of the plurality of pieces of DCI include the third DCI format and the fourth DCI format, the processing module 702 is configured to determine that the candidate time domain resource set is a union set of the time domain resource set corresponding to the third DCI format, the time domain resource set corresponding to the fourth DCI format, and the first time domain resource set. Alternatively, if the DCI format of the DCI or the DCI formats of the plurality of pieces of DCI includes/include neither the third DCI format nor the fourth DCI format, the processing module 702 is configured to determine that the candidate time domain resource set is the first time domain resource set.

All related content of the steps in the foregoing method embodiment may be cited in function descriptions of corresponding functional modules. Details are not described herein again.

It should be understood that the processing module 702 in this embodiment of this application may be implemented by a processor or a processor-related circuit component, and the transceiver module 701 may be implemented by a transceiver or a transceiver-related circuit component.

Figure 8:
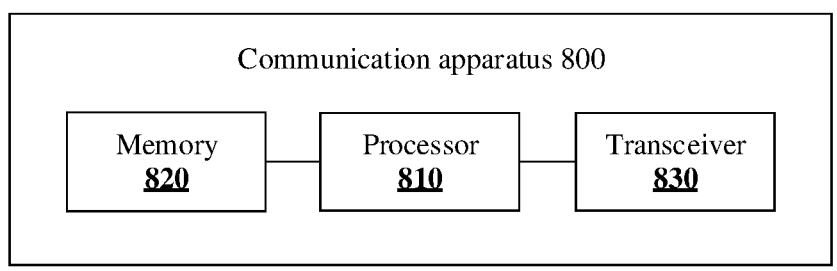
FIG. 8 is a schematic diagram of a hardware structure of a communication apparatus according to an embodiment of this application.

As shown in FIG. 8, an embodiment of this application further provides a communication apparatus 800. When the communication apparatus is implemented as a terminal device, the communication apparatus 800 includes a processor 810, a memory 820, and a transceiver 830. The memory 820 stores instructions or a program. The processor 810 is configured to execute the instructions or the program stored in the memory 820. When the instructions or the program stored in the memory 820 are executed or is executed, the processor 810 is configured to perform an operation performed by the processing module 702 in the foregoing embodiment, and the transceiver 830 is configured to perform an operation performed by the transceiver module 701 in the foregoing embodiment.

It should be understood that the communication apparatus 700 or the communication apparatus 800 in embodiments of this application may correspond to the terminal device in the communication method in FIG. 5 in embodiments of this application, and operations and/or functions of modules in the communication apparatus 700 or the communication apparatus 800 are respectively used to implement corresponding procedures in the methods in FIG. 5. For brevity, details are not described herein again.

Figure 9:
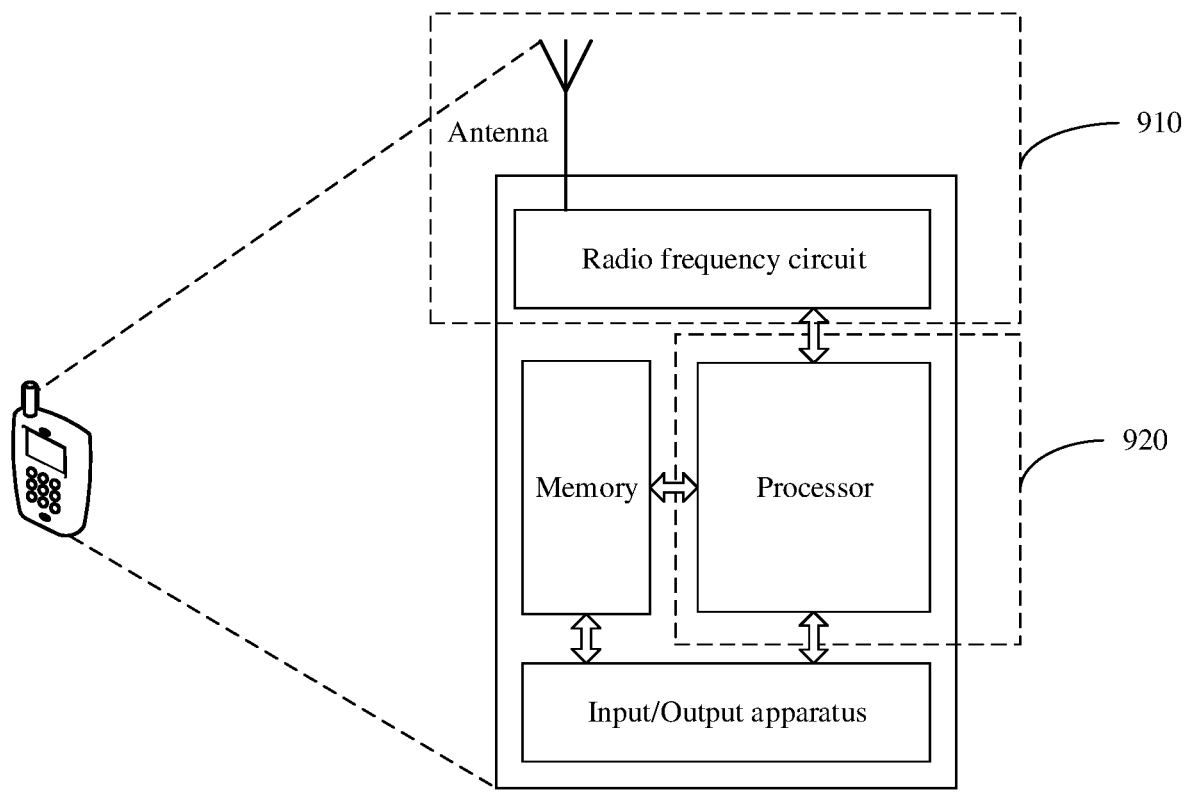
FIG. 9 is another schematic diagram of a structure of a communication apparatus according to an embodiment of this application.

When the communication apparatus is a terminal device, FIG. 9 is a simplified schematic diagram of a structure of the terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends the radio frequency signal to the outside in a form of an electromagnetic wave through the antenna. When the data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of descriptions, FIG. 9 shows only one memory and one processor. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, an antenna and a radio frequency circuit that have sending and receiving functions may be considered as a transceiver unit of the terminal device, and a processor that has a processing function may be considered as a processing unit of the terminal device. As shown in FIG. 9, the terminal device includes a transceiver unit 910 and a processing unit 920. The transceiver unit 910 may also be referred to as a transceiver, a transceiver machine, a transceiver apparatus, or the like. The processing unit 920 may also be referred to as a processor, a processing board, a processing module, a processing apparatus, or the like. Optionally, a component that is in the transceiver unit 910 and that is configured to implement the receiving function may be considered as a receiving unit, and a component that is in the transceiver unit 910 and that is configured to implement the sending function may be considered as a sending unit. In other words, the transceiver unit 910 includes the receiving unit and the sending unit. Sometimes, the transceiver unit 910 may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 910 is configured to perform a sending operation and a receiving operation on a terminal device side in the foregoing method embodiments, and the processing unit 920 is configured to perform an operation other than the sending operation and the receiving operation of the terminal device in the foregoing method embodiments.

For example, in an implementation, the transceiver unit 910 is configured to perform a sending/receiving operation on the terminal device side in S503 in FIG. 5, the transceiver unit 910 is further configured to perform a sending/receiving operation on the terminal device side in S506 in FIG. 5, and/or the transceiver unit 910 is further configured to perform another sending/receiving step on the terminal device side in this embodiment of this application. The processing unit 920 is configured to perform S501 and S504 in FIG. 5, and/or the processing unit 920 is further configured to perform another processing step on the terminal device side in this embodiment of this application.

For another example, in another implementation, the transceiver unit 910 is configured to perform a sending operation on the terminal device side in step S500 in FIG. 6, and/or the transceiver unit 910 is further configured to perform another sending/receiving step on the terminal device side in this embodiment of this application. The processing unit 920 is configured to perform another processing step on the terminal device side in this embodiment of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 10:
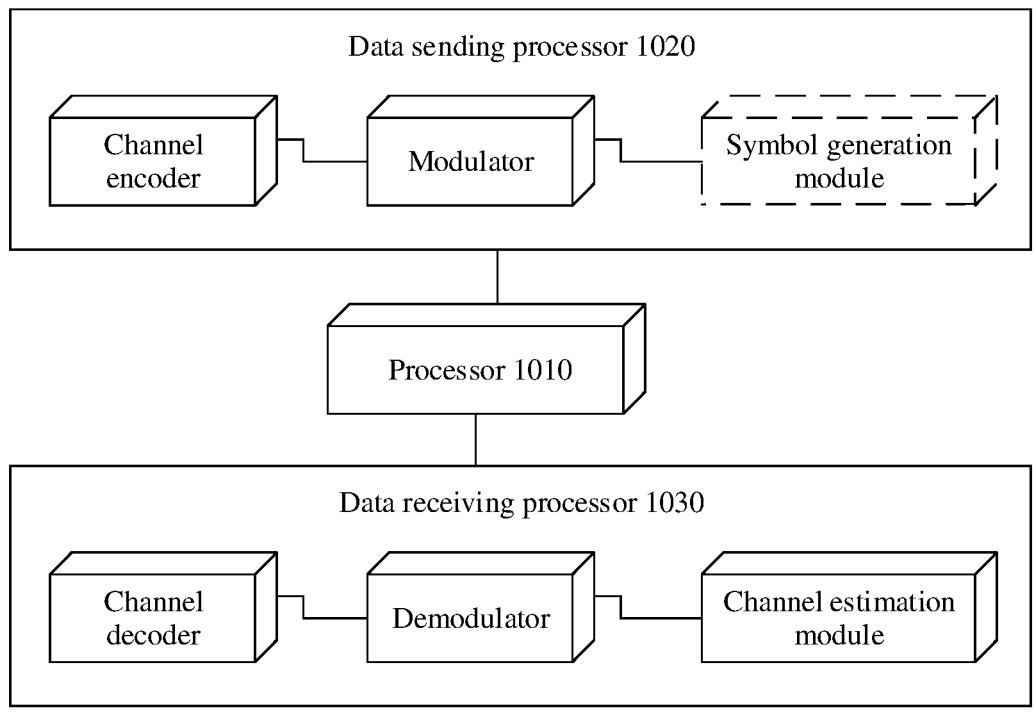
FIG. 10 is another schematic diagram of a structure of a communication apparatus according to an embodiment of this application.

When the communication apparatus in this embodiment of this application is a terminal device, refer to a device shown in FIG. 10. For example, the device may implement a function similar to that of the processor 810 in FIG. 8. In FIG. 10, the device includes a processor 1010, a data sending processor 1020, and a data receiving processor 1030. The processing module 702 in the foregoing embodiment may be the processor 1010 in FIG. 10, and implements a corresponding function. The transceiver module 701 in the foregoing embodiment may be the data sending processor 1020 and/or the data receiving processor 1030 in FIG. 10. Although FIG. 10 shows a channel encoder, a channel decoder, a symbol generation module, and a channel estimation module, it may be understood that these modules are merely examples, and do not constitute a limiting description of this embodiment of this application.

Figure 11:
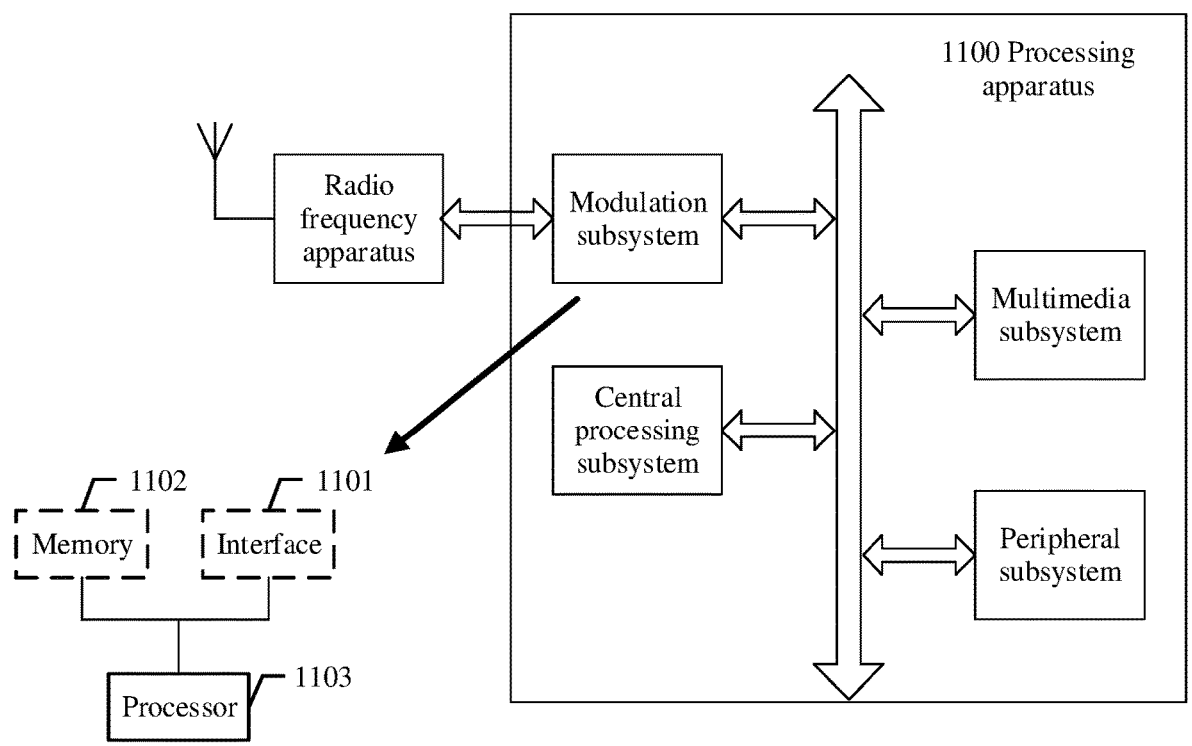
FIG. 11 is another schematic diagram of a structure of a communication apparatus according to an embodiment of this application.

FIG. 11 shows another form of embodiments of this application. A processing apparatus 1100 includes modules such as a modulation subsystem, a central processing subsystem, a peripheral subsystem, and a multimedia subsystem. The communication apparatus in this embodiment of this application may be used as the modulation subsystem in the processing apparatus. Specifically, the modulation subsystem may include a processor 1103 and an interface 1101. The processor 1103 completes a function of the foregoing processing module 702, and the interface 1101 completes a function of the foregoing transceiver module 701. In another variation, the modulation subsystem includes a memory 1102, a processor 1103, and a program that is stored in the memory 1102 and that can be run on the processor. When executing the program, the processor 1103 implements the method on the terminal device side in the foregoing method embodiments. It should be noted that the memory 1102 may be non-volatile or may be volatile, and may be located inside the modulation subsystem or in the processing apparatus 1100, provided that the memory 1102 can be connected to the processor 1103.

In another form of this embodiment of this application, a computer-readable storage medium is provided. The computer-readable storage medium stores instructions. When the instructions are executed, the method on the terminal device side in the foregoing method embodiments is performed.

In another form of this embodiment of this application, a computer program product including instructions is provided. When the instructions are executed, the method on the terminal device side in the foregoing method embodiments is performed.

Figure 12:
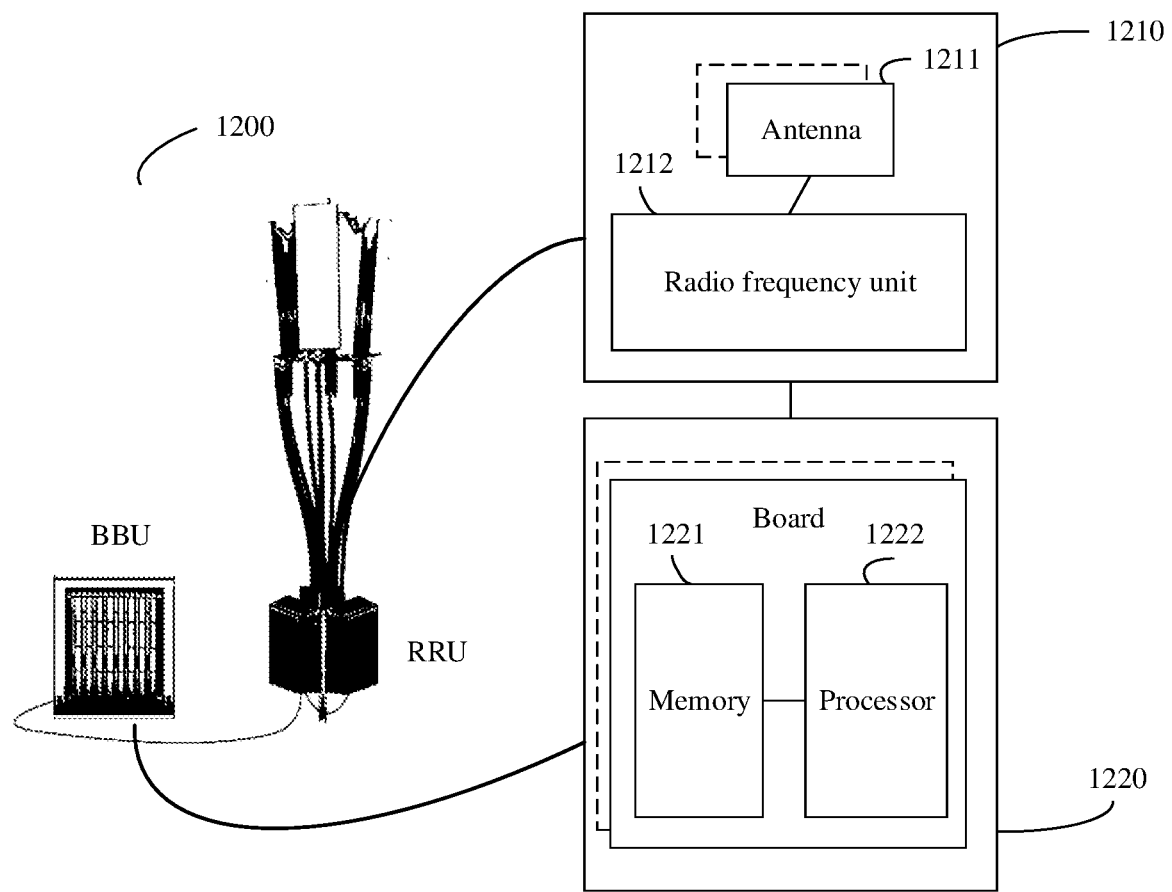
FIG. 12 is another schematic diagram of a structure of a communication apparatus according to an embodiment of this application.

When the communication apparatus in this embodiment of this application is a network device, the network device may be shown in FIG. 12. A communication apparatus 1200 includes one or more radio frequency units, such as a remote radio unit (RRU) 1210 and one or more baseband units (BBUs) (which may also be referred to as digital units (DUs)) 1220. The RRU 1210 may be referred to as a transceiver module, and corresponds to the transceiver module 701 in FIG. 7. Optionally, the transceiver module may also be referred to as a transceiver machine, a transceiver circuit, a transceiver, or the like, and may include at least one antenna 1211 and a radio frequency unit 1212. The RRU 1210 is mainly configured to send and receive a radio frequency signal and perform conversion between the radio frequency signal and a baseband signal. For example, the RRU 1210 is configured to send a random access response message to the terminal device. The BBU 1220 is mainly configured to perform baseband processing, control a base station, and the like. The RRU 1210 and the BBU 1220 may be physically disposed together, or may be physically disposed separately, namely, a distributed base station.

The BBU 1220 is a control center of the base station, and may also be referred to as a processing module. The BBU 1220 may correspond to the processing module 702 in FIG. 7, and is mainly configured to implement a baseband processing function such as channel coding, multiplexing, modulation, or spreading. For example, the BBU (the processing module) may be configured to control the base station to perform an operation procedure related to the network device in the foregoing method embodiments, for example, generate the foregoing random access response message.

In an example, the BBU 1220 may include one or more boards, and a plurality of boards may jointly support a radio access network (such as an LTE network) having a single access standard, or may separately support radio access networks (such as an LTE network, a 5G network, or another network) having different access standards. The BBU 1220 further includes a memory 1221 and a processor 1222. The memory 1221 is configured to store necessary instructions and data. The processor 1222 is configured to control the base station to perform a necessary action, for example, configured to control the base station to perform an operation procedure related to the network device in the foregoing method embodiments. The memory 1221 and the processor 1222 may serve one or more boards. In other words, the memory and the processor may be deployed on each board. Alternatively, a plurality of boards may share the same memory and the same processor. In addition, a necessary circuit may be further disposed on each board.

It should be understood that, the processor mentioned in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory mentioned in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification is intended to include but not limited to these memories and any memory of another appropriate type.

It should be noted that the term "and/or" describes an association relationship between associated objects and indicates that three relationships may exist. For example, A and/or B may indicate the following cases: Only A exists, both A and B exist, and only B exists. In addition, the character "/" generally indicates an "or" relationship between the associated objects.

It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions of embodiments of this application.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on this understanding, the technical solutions of this application essentially, or the part contributing to the current technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device, indication information from a network device, wherein the indication information indicates a downlink control information (DCI) format of one piece of DCI or DCI formats of a plurality of pieces of DCI;
   determining, by the terminal device, a candidate time domain resource set based on the DCI format of the one piece of DCI or the DCI formats of the plurality of pieces of DCI;
   determining, by the terminal device based on the candidate time domain resource set, a codebook, wherein the codebook comprises feedback information of one or more physical downlink shared channels (PDSCHs) received by the terminal device, and the one or more PDSCHs are received using a time domain resource position indicated by the candidate time domain resource set; and
   sending the codebook to the network device.

2. The communication method according to claim 1, wherein determining, by the terminal device, the candidate time domain resource set based on the DCI format of the one piece of DCI comprises:
   when the DCI format is a first DCI format, the first DCI format being one of a DCI format 1_0, a DCI format 1_1, or a DCI format 1_2, determining, by the terminal device, that the candidate time domain resource set is a time domain resource set corresponding to the first DCI format; and
   determining, by the terminal device, the candidate time domain resource set based on the DCI formats of the plurality of pieces of DCI comprises:
   when the DCI formats of the plurality of pieces of DCI comprise at least one of following:
   the DCI format 1_0 and the DCI format 1_1,
   the DCI format 1_0 and the DCI format 1_2,
   the DCI format 1_1 and the DCI format 1_2, or the DCI format 1_0, the DCI format 1_1, and the DCI format 1_2, determining, by the terminal device, that the candidate time domain resource set is a union set of a plurality of time domain resource sets corresponding to the DCI formats of the plurality of pieces of DCI.

3. The communication method according to claim 1, wherein determining, by the terminal device, the candidate time domain resource set based on the DCI format of the one piece of DCI or the DCI formats of the plurality of pieces of DCI comprises:

when the DCI format of the one piece of DCI or the DCI formats of the plurality of pieces of DCI comprises/comprise a second DCI format excluding a third DCI format, determining, by the terminal device, that the candidate time domain resource set is a union set of a first time domain resource set that is preset and a time domain resource set corresponding to the second DCI format; or when the DCI format of the one piece of DCI or the DCI formats of the plurality of pieces of DCI comprises/comprise the third DCI format excluding the second DCI format, determining, by the terminal device, that the candidate time domain resource set is a union set of the first time domain resource set that is preset and a time domain resource set corresponding to the third DCI format.

4. The communication method according to claim 1, wherein determining, by the terminal device, the candidate time domain resource set based on the DCI format of the one piece of DCI or the DCI formats of the plurality of pieces of DCI comprises:

when the DCI formats of the plurality of pieces of DCI comprise a second DCI format and a third DCI format, determining, by the terminal device, that the candidate time domain resource set is a union set of a time domain resource set corresponding to the second DCI format, a time domain resource set corresponding to the third DCI format, and a first time domain resource set that is preset; or when the DCI format of the one piece of DCI or the DCI formats of the plurality of pieces of DCI comprises/comprise neither the second DCI format nor the third DCI format, determining, by the terminal device, that the candidate time domain resource set is the first time domain resource set that is preset.

5. A communication method, comprising:

sending, by a network device, indication information to a terminal device, wherein the indication information indicates a downlink control information (DCI) format of one piece of DCI or DCI formats of a plurality of pieces of DCI;

determining, by the network device, a candidate time domain resource set based on the DCI format of the one piece of DCI or the DCI formats of the plurality of pieces of DCI;

determining, by the network device, a quantity of bits in a codebook based on the candidate time domain resource set, wherein the codebook comprises feedback information of one or more physical downlink shared channels (PDSCHs) that have been transmitted by the network device, and the one or more PDSCHs are transmitted using a time domain resource position indicated by the candidate time domain resource set; and receiving, by the network device, the codebook.

6. The communication method according to claim 5, wherein determining, by the network device, the candidate time domain resource set based on the DCI format of the one piece of DCI comprises:

when the DCI format of the one piece of DCI is a first DCI format, the first DCI format being one of a DCI format 1_0, a DCI format 1_1, or a DCI format 1_2, determining, by the network device, that the candidate time domain resource set is a time domain resource set corresponding to the first DCI format; or determining, by the network device, the candidate time domain resource set based on the DCI formats of the plurality of pieces of DCI comprises:

when the DCI formats of the plurality of pieces of DCI comprise at least one of following:
the DCI format 1_0 and the DCI format 1_1,
the DCI format 1_0 and the DCI format 1_2,
the DCI format 1_1 and the DCI format 1_2, or
the DCI format 1_0, the DCI format 1_1, and the DCI format 1_2, determining, by the network device, that the candidate time domain resource set is a union set of a plurality of time domain resource sets corresponding to the DCI formats of the plurality of pieces of DCI.

7. The communication method according to claim 5, wherein determining, by the network device, the candidate time domain resource set based on the DCI format of the one piece of DCI or the DCI formats of the plurality of pieces of DCI comprises:

when the DCI formats of the plurality of pieces of DCI comprise a second DCI format and a third DCI format, determining, by the network device, that the candidate time domain resource set is a union set of a time domain resource set corresponding to the second DCI format, a time domain resource set corresponding to the third DCI format, and a first time domain resource set that is preset; or when the DCI format of the one piece of DCI or the DCI formats of the plurality of pieces of DCI comprises/comprise neither the second DCI format nor the third DCI format, determining, by the network device, that the candidate time domain resource set is the first time domain resource set that is preset.

8. The communication method according to claim 5, wherein determining, by the network device, the candidate time domain resource set based on the DCI format of the one piece of DCI or the DCI formats of the plurality of pieces of DCI comprises:

when the DCI format of the one piece of DCI or the DCI formats of the plurality of pieces of DCI comprises/comprise a second DCI format excluding a third DCI format, determining, by the network device, that the candidate time domain resource set is a union set of a first time domain resource set that is preset and a time domain resource set corresponding to the second DCI format; or when the DCI format of the one piece of DCI or the DCI formats of the plurality of pieces of DCI comprises/comprise the third DCI format excluding the second DCI format, determining, by the network device, that the candidate time domain resource set is a union set of the first time domain resource set that is preset and a time domain resource set corresponding to the third DCI format.

9. A communication apparatus, comprising:
a transceiver, configured to:

receive indication information from a network device, wherein the indication information indicates a downlink control information (DCI) format of one piece of DCI or DCI formats of a plurality of pieces of DCI; and at least one processor, configured to determine a candidate time domain resource set based on the DCI format of the one piece of DCI or the DCI formats of the plurality of pieces of DCI, and determine a codebook based on the candidate time domain resource set, wherein the codebook comprises feedback information of one or more physical downlink shared channels (PDSCHs) received by the communication apparatus, and the one or more PDSCHs are received using a time domain resource position indicated by the candidate time domain resource set; and wherein the transceiver is further configured to send the codebook to the network device.

10. The communication apparatus according to claim 9, wherein, when the DCI formats of the plurality of pieces of DCI comprise at least one of following:
a DCI format 1_0 and a DCI format 1_1,
the DCI format 1_0 and a DCI format 1_2,
the DCI format 1_1 and the DCI format 1_2, or
the DCI format 1_0, the DCI format 1_1, and the DCI format 1_2,
the at least one processor is configured to determine that the candidate time domain resource set is a union set of a plurality of time domain resource sets corresponding to the DCI formats of the plurality of pieces of DCI.

11. The communication apparatus according to claim 9, wherein, when the DCI format of the one piece of DCI or the DCI formats of the plurality of pieces of DCI comprises/ comprise a third DCI format excluding a second DCI format, the at least one processor is configured to determine that the candidate time domain resource set is a union set of a first time domain resource set that is preset and a time domain resource set corresponding to the third DCI format;

when the DCI formats of the plurality of pieces of DCI comprise the second DCI format and the third DCI format, the at least one processor is configured to determine that the candidate time domain resource set is a union set of a time domain resource set corresponding to the second DCI format, the time domain resource set corresponding to the third DCI format, and the first time domain resource set that is preset; or when the DCI format of the one piece of DCI or the DCI formats of the plurality of pieces of DCI comprises/ comprise neither the second DCI format nor the third DCI format, the at least one processor is configured to determine that the candidate time domain resource set is the first time domain resource set that is preset.

12. The communication apparatus according to claim 9, wherein, when the DCI format is a first DCI format, the first DCI format being one of a DCI format 1_0, a DCI format 1_1, or a DCI format 1_2, the at least one processor is configured to determine that the candidate time domain resource set is a time domain resource set corresponding to the first DCI format.

13. The communication apparatus according to claim 9, wherein, when the DCI format of the one piece of DCI or the DCI formats of the plurality of pieces of DCI comprises/ comprise a second DCI format excluding a third DCI format, the at least one processor is configured to determine that the candidate time domain resource set is a union set of a first time domain resource set that is preset and a time domain resource set corresponding to the second DCI format.

14. A communication apparatus, comprising:
a transceiver, configured to:
send indication information to a terminal device, wherein the indication information indicates a downlink control information (DCI) format of one piece of DCI or DCI formats of a plurality of pieces of DCI; and at least one processor, configured to determine a candidate time domain resource set based on the DCI format of the one piece of DCI or the DCI formats of the plurality of pieces of DCI, and determine a quantity of bits in a codebook based on the candidate time domain resource set, wherein the codebook comprises feedback information of one or more physical downlink shared channels (PDSCHs) that have been transmitted by the communication apparatus, and the one or more PDSCHs are transmitted using a time domain resource position indicated by the candidate time domain resource set; and wherein the transceiver is further configured to receive the codebook.

15. The communication apparatus according to claim 14, wherein, when the DCI format of the one piece of DCI is a first DCI format, the first DCI format being one of a DCI format 1_0, a DCI format 1_1, or a DCI format 1_2, the at least one processor is configured to determine that the candidate time domain resource set is a time domain resource set corresponding to the first DCI format; or when the DCI formats of the plurality of pieces of DCI comprise at least one of following:
the DCI format 1_0 and the DCI format 1_1,
the DCI format 1_0 and the DCI format 1_2,
the DCI format 1_1 and the DCI format 1_2, or
the DCI format 1_0, the DCI format 1_1, and the DCI format 1_2,
the at least one processor is configured to determine that the candidate time domain resource set is a union set of a plurality of time domain resource sets corresponding to the DCI formats of the plurality of pieces of DCI.

16. The communication apparatus according to claim 14, wherein, when the DCI format of the one piece of DCI or the DCI formats of the plurality of pieces of DCI comprises/ comprise a second DCI format excluding a third DCI format, the processor is configured to determine that the candidate time domain resource set is a union set of a first time domain resource set that is preset and a time domain resource set corresponding to the third DCI format.

17. The communication apparatus according to claim 14, wherein, when the DCI format of the one piece of DCI or the DCI formats of the plurality of pieces of DCI comprises/ comprise a third DCI format excluding a second DCI format, the at least one processor is configured to determine that the candidate time domain resource set is a union set of a first time domain resource set that is preset and a time domain resource set corresponding to the third DCI format.

18. The communication apparatus according to claim 14, wherein, when the DCI formats of the plurality of pieces of DCI comprise a second DCI format and a third DCI format, the at least one processor is configured to determine that the candidate time domain resource set is a union set of a time domain resource set corresponding to the second DCI format, a time domain resource set corresponding to the third DCI format, and a first time domain resource set that is preset.

19. The communication apparatus according to claim 14, wherein, when the DCI format of the one piece of DCI or the DCI formats of the plurality of pieces of DCI comprises/comprise neither a second DCI format nor a third DCI format, the at least one processor is configured to determine that the candidate time domain resource set is a first time domain resource set that is preset.

* * * * *